(12) United States Patent
Kishikawa et al.

(10) Patent No.: US 12,379,712 B2
(45) Date of Patent: Aug. 5, 2025

(54) CONTROL MODE SWITCHING APPARATUS AND CONTROL MODE SWITCHING METHOD

(71) Applicant: Panasonic Intellectual Property Corporation of America, Torrance, CA (US)

(72) Inventors: Takeshi Kishikawa, Osaka (JP); Yoshihiro Ujiie, Tokyo (JP); Ryo Hirano, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 154 days.

(21) Appl. No.: 18/112,311

(22) Filed: Feb. 21, 2023

(65) Prior Publication Data

US 2023/0205181 A1 Jun. 29, 2023

Related U.S. Application Data

(63) Continuation of application No. PCT/JP2021/025866, filed on Jul. 8, 2021.

(30) Foreign Application Priority Data

Sep. 1, 2020 (WO) ................. PCT/JP2020/033120

(51) Int. Cl.
*G05B 19/4155* (2006.01)
*G05D 1/00* (2006.01)

(52) U.S. Cl.
CPC ....... *G05B 19/4155* (2013.01); *G05D 1/0038* (2013.01); *G05D 1/0061* (2013.01); *G05B 2219/50391* (2013.01)

(58) Field of Classification Search
None
See application file for complete search history.

(56) References Cited

U.S. PATENT DOCUMENTS 11,531,330 B2 * 12/2022 Huang .................. H04L 9/0637
2015/0271201 A1    9/2015 Ruvio et al.
(Continued)

FOREIGN PATENT DOCUMENTS

JP    2005-144612 A    6/2005
JP    2018-040426 A    3/2018
(Continued)

OTHER PUBLICATIONS

Qayyum et al., "Securing Connected & Autonomous Vehicles: Challenges Posed by Adversarial Machine Learning and The Way Forward", IEEE Communications Surveys & Tutorials, vol. 22, Issue 2, May 29, 2019, pp. 1-29 (Year: 2019).*
(Continued)

*Primary Examiner* — Tamara L Weber
(74) *Attorney, Agent, or Firm* — Greenblum and Bernstein, P.L.C.

(57) ABSTRACT

A control mode switching apparatus switches a control mode of a robot. The control mode includes at least two of a remote control mode, a manual control mode, and an autonomous control mode. The control mode switching apparatus includes: an anomaly detector that, based on a communication message on a control network in the robot and the control mode, obtains a detection result of at least one anomaly among a user anomaly caused by user control, a robot anomaly caused by the control network, an operating environment anomaly caused by an operating environment of the robot, and an application anomaly caused by an application; and a switcher that calculates, for each type of anomaly detected, a score indicating a likelihood that the
(Continued)

type is a cause of the anomaly in the robot, and switches the control mode based on the score calculated.

12 Claims, 20 Drawing Sheets

(56) References Cited

U.S. PATENT DOCUMENTS

| | | | |
|---|---|---|---|
| 2017/0031358 A1* | 2/2017 | McHugh | G05D 1/0278 |
| 2017/0149820 A1 | 5/2017 | Ruvio et al. | |
| 2018/0011485 A1 | 1/2018 | Ferren | |
| 2018/0065618 A1 | 3/2018 | Nishimine | |
| 2018/0118219 A1 | 5/2018 | Hiei et al. | |
| 2018/0196941 A1* | 7/2018 | Ruvio | H04L 63/1425 |
| 2018/0292822 A1 | 10/2018 | Ichikawa et al. | |
| 2018/0297470 A1 | 10/2018 | Kim | |
| 2019/0056729 A1 | 2/2019 | Ferguson et al. | |
| 2019/0273749 A1 | 9/2019 | Nishimoto et al. | |
| 2020/0053113 A1 | 2/2020 | Sasaki et al. | |

FOREIGN PATENT DOCUMENTS

| | | |
|---|---|---|
| JP | 2018-180859 | 11/2018 |
| JP | 6508631 B2 | 5/2019 |
| JP | 2019-153875 A | 9/2019 |
| WO | 2014/061021 A1 | 4/2014 |

OTHER PUBLICATIONS

Extended European Search Report (EESR) from European Patent Office (EPO) in European Patent Appl. No. 21863952.4, dated Jan. 25, 2024.

International Search Report, mailed Dec. 8, 2020, by the Japan Patent Office (JPO), in International Application No. PCT/JP2020/033120.

International Search Report, mailed Sep. 21, 2021, by the Japan Patent Office (JPO), in International Application No. PCT/JP2021/025866.

* cited by examiner

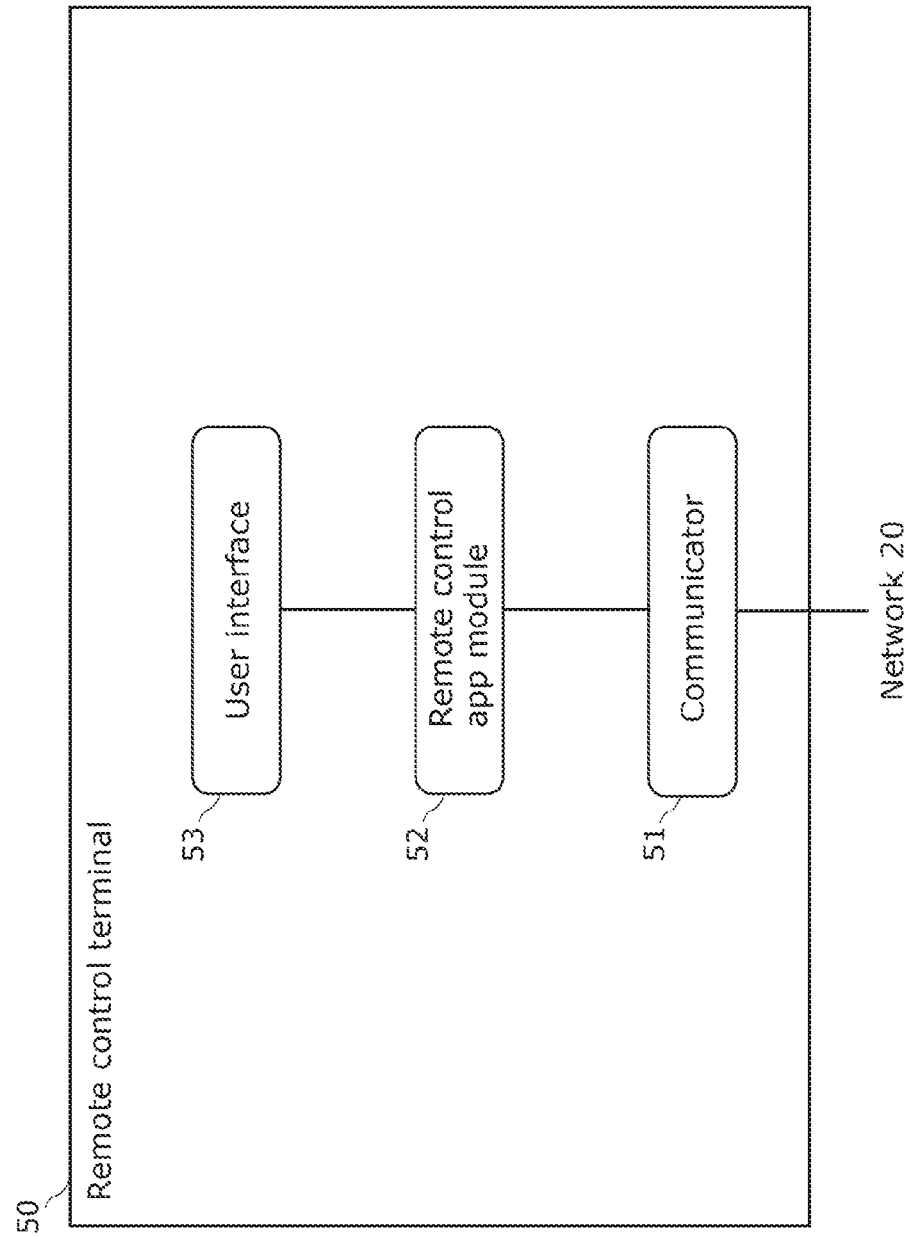

FIG. 12

| Anomaly detection details | Time | Detecting device |
|---|---|---|
| Deviation from route | 10:50:20 | Central ECU |
| Emergency brake activation | 10:45:30 | Central ECU |
| Sudden acceleration/ deceleration | 10:45:29 | Central ECU |
| ... | ... | ... |

FIG. 13

| Subject | | Trust score |
|---|---|---|
| App | Remote control app | 100 |
| | Autonomous control app | 100 |
| | Manual control app | 100 |
| User | A | 80 |
| | B | 80 |
| Robot | Sensor ECU | 100 |
| | Actuator ECU | 100 |
| Communication | Robot internal network | 100 |
| | External communication | 100 |
| Operating environment | Person/communication environment | 50 |

FIG. 14

| User | Permissions |
|---|---|
| A | Control |
| B | Monitoring |

FIG. 15

| |
|---|
| Control mode |
| Remote control |

FIG. 16

| Robot | Control mode | Location information | Operating state |
|---|---|---|---|
| 10a | Remote | XXX | Traveling on sidewalk |
| 10b | Autonomous | YYY | Vehicle stopped |
| 10c | Manual | ZZZ | Stopped |
| ... | ... | ... | ... |

FIG. 17

| User | State |
|---|---|
| A | Controlling robot 10a |
| B | Monitoring robot 10a |
| C | Monitoring robot 10b |
| D | Monitoring robot 10c |
| ... | ... |

FIG. 18

| Robot | Trust score |
|---|---|
| 10a | 100 |
| 10b | 100 |
| 10c | 50 |
| ... | ... |

FIG. 19

| User | Trust score |
|---|---|
| A | 80 |
| B | 80 |
| C | 50 |
| D | 20 |
| ... | ... |

CONTROL MODE SWITCHING APPARATUS AND CONTROL MODE SWITCHING METHOD

CROSS REFERENCE TO RELATED APPLICATIONS

This is a continuation application of PCT International Application No. PCT/JP2021/025866 filed on Jul. 8, 2021, designating the United States of America, which is based on and claims priority of PCT International Application No. PCT/JP2020/033120 filed on Sep. 1, 2020. The entire disclosures of the above-identified applications, including the specifications, drawings and claims are incorporated herein by reference in their entirety.

FIELD

The present disclosure relates to a control mode switching apparatus and a control mode switching method that switch control modes of a robot.

BACKGROUND

In recent years, many robot systems (robots) are being used in daily life, and robots are therefore becoming increasingly important. In particular, recent labor shortages, increases in the distribution of goods, and the like have led to expectations for the widespread use of self-driving trucks, autonomous delivery robots, and the like.

Unlike conventional industrial robots that operate in predefined environments such as factories, such mobility robots are expected to operate in public places such as public roads.

Robots operating in public places have a variety of security risks such as improper access and improper control. Furthermore, the security risks of robots not only involve the risk of information theft, service failure, and the like as per conventional IT systems, but also may affect people, objects, and the environment in the vicinity of the robot.

Under such circumstances, a method which, for example, monitors whether security anomalies have occurred in an automobile control network and responds to such anomalies has been disclosed (see PTL 1, for example).

CITATION LIST

Patent Literature

PTL 1: Japanese Patent No. 6508631

SUMMARY

Technical Problem

However, although a method such as that in PTL 1 makes it possible to detect the occurrence of an attack on an in-vehicle network, it is not possible to determine the response that should be taken immediately for the robot under control.

For example, depending on the control state of the robot when an attack is detected, simply stopping the robot may conversely cause more damage. As such, when an attack is detected, it may be necessary to allow the robot to continue to be controlled in a safe control mode.

Accordingly, the present disclosure provides a control mode switching apparatus and a control mode switching method for continuing safe control.

Solution to Problem

A control mode switching apparatus according to one aspect of the present disclosure is a control mode switching apparatus that switches a control mode of a robot. The control mode includes at least two of a remote control mode in which the robot is controlled by a first user over an external network, a manual control mode in which the robot is controlled by being operated by a second user without using the external network, and an autonomous control mode in which the robot is controlled based on sensor information obtained by a sensor provided in the robot. The control mode switching apparatus includes: an obtainer that, based on a communication message on a control network in the robot and the control mode, obtains a detection result of detecting at least one anomaly among a user anomaly caused by control performed by the first user or the second user, a robot anomaly caused by the control network, an operating environment anomaly caused by an operating environment of the robot, and an application anomaly caused by an application run by a control device that is connected to the control network and that controls the robot; and a switcher that, based on the detection result obtained, calculates, for each of types of the at least one anomaly detected, a score indicating a likelihood that the type of the anomaly is a cause of the at least one anomaly occurring in the robot, and switches the control mode of the robot based on the score calculated.

A control mode switching method according to one aspect of the present disclosure is a control mode switching method for switching a control mode of a robot. The control mode includes at least two of a remote control mode in which the robot is controlled by a first user over an external network, a manual control mode in which the robot is controlled by being operated by a second user without using the external network, and an autonomous control mode in which the robot is controlled based on sensor information obtained by a sensor provided in the robot. The control mode switching method includes: obtaining, based on a communication message on a control network in the robot and the control mode, a detection result of detecting at least one anomaly among a user anomaly caused by control performed by the first user or the second user, a robot anomaly caused by the control network, an operating environment anomaly caused by an operating environment of the robot, and an application anomaly caused by an application run by a control device that is connected to the control network and that controls the robot; and based on the detection result obtained, calculating, for each of types of the at least one anomaly detected, a score indicating a likelihood that the type of the at least one anomaly is a cause of the anomaly occurring in the robot, and switching the control mode of the robot based on the score calculated.

Advantageous Effects

According to the present disclosure, a control mode switching apparatus and the like which enable safe control to be continued can be realized.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 11 is a block diagram illustrating a remote control terminal according to an embodiment.

FIG. 12 is a diagram illustrating an example of an anomaly detection result according to an embodiment.

FIG. 13 is a diagram illustrating an example of a trust score according to an embodiment.

FIG. 14 is a diagram illustrating an example of user information according to an embodiment.

FIG. 15 is a diagram illustrating an example of a control mode according to an embodiment.

FIG. 16 is a diagram illustrating an example of robot states according to an embodiment.

FIG. 17 is a diagram illustrating an example of account information according to an embodiment.

FIG. 18 is a diagram illustrating an example of robot trust scores according to an embodiment.

FIG. 19 is a diagram illustrating an example of user trust scores according to an embodiment.

Figure 1:
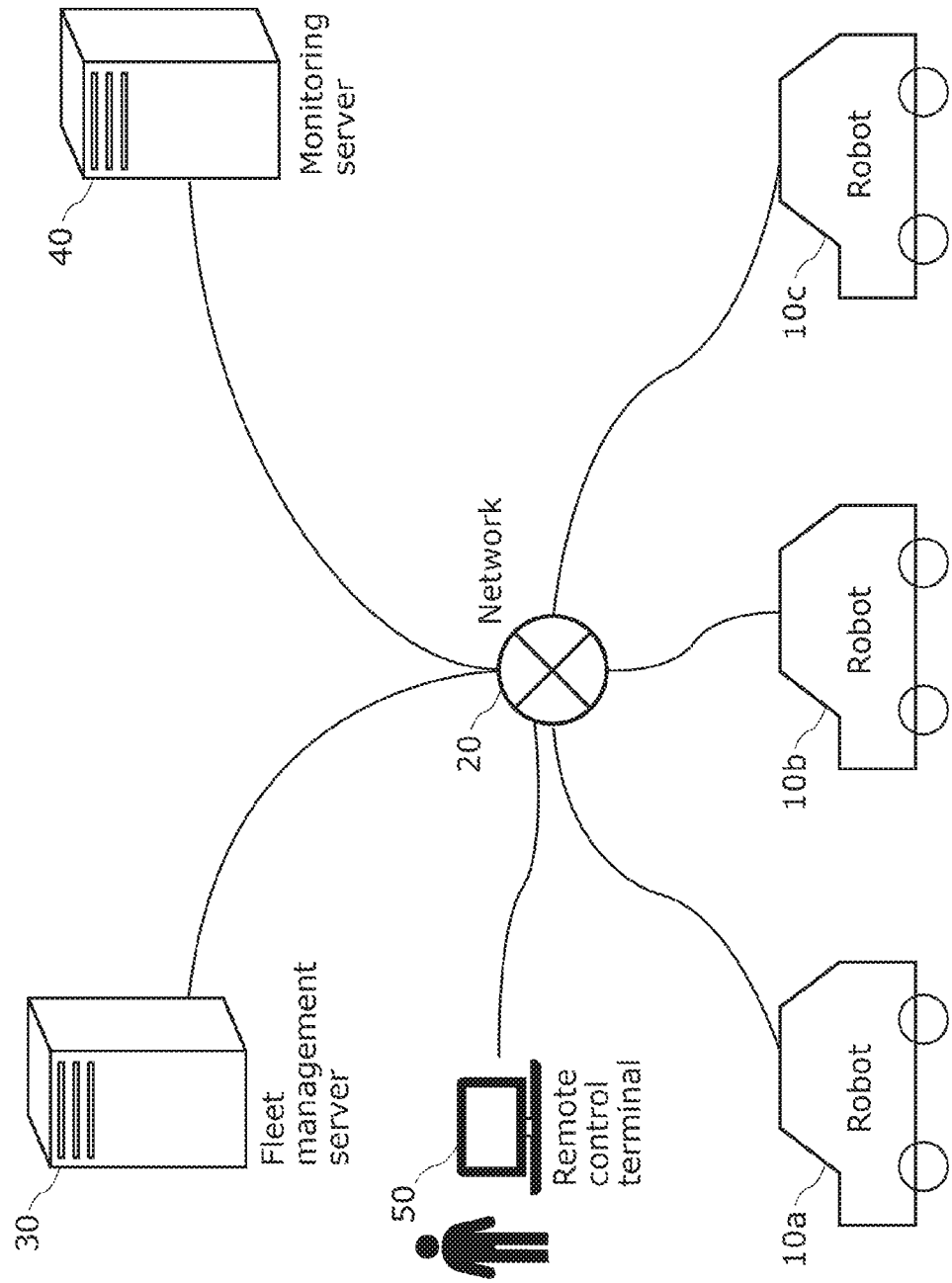
FIG. 1 is an overall block diagram illustrating a robot monitoring system according to an embodiment.

DESCRIPTION OF EMBODIMENTS (Circumstances Leading to the Present Disclosure)

Before describing the present disclosure, findings leading to the present disclosure will be described.

As described in the Background Art section, robots such as self-driving trucks, autonomous delivery robots, and the like are expected to become widespread. However, unlike conventional industrial robots that operate in predefined environments such as factories, such mobility robots are expected to operate in a variety of environments such as public roads, and issues remain with respect to achieving full autonomous control.

Accordingly, robots that can be remotely monitored or remotely controlled by remote operators, fleet management systems that manage the states of many robots, and the like are required to handle situations where robots have difficulty with autonomous control and to achieve efficient robot operations.

Utilizing such techniques makes it possible to expand the remote work market and provide workplaces for those people who cannot work due to issues such as physical reasons, places of residence, working hours, and the like, which helps solve many issues.

On the other hand, there are also cybersecurity issues with respect to robots operating in public places. For example, in automobiles, cases of remote intrusion into in-vehicle networks and improper control of automobiles have been reported. There have also been cases of attacks in which ships are guided by transmitting spoofed signals to the Global Positioning System (GPS) of the ship systems.

In this manner, with robots that operate in public places, it is necessary not only to ensure the security of the control network, control applications, control devices, and sensors within the robot, but also to take into account the possibility of the environment in which the robot actually operates being unreliable, physical access by a malicious third party, and the like.

It is also necessary to take into account the security of external devices which access the robot, e.g., servers, terminals running client applications, and the like.

Furthermore, in remotely-controlled robots, it is expected that an unspecified number of remote operators will control an unspecified number of robots, which distributes the loads of the remote operators and promotes efficient sharing of labor by obtaining the necessary labor when needed. In such cases, it is necessary to take into account improper control by an unspecified number of remote operators.

In this manner, robots operating in public places involves a variety of security risks. Furthermore, the security risks of robots not only involve the risk of information theft, service failure, and the like as per conventional IT systems, but also may affect people, objects, and the environment in the vicinity of the robot.

The security risks for robots operating in public places include the possibility of physical damage to people, objects, and the environment, and it is therefore necessary to shift to a safe state immediately when an attack is detected. However, depending on the control state of the robot when the attack is detected, it is conceivable that simply stopping the robot will conversely cause even more damage.

Accordingly, a system may be required which, when an attack is detected, can determine the cause of the attack on the robot and continue to control the robot in an appropriate control mode. For example, a system may be required which, when an attack is detected, allows the robot to continue to be controlled in a safe control mode.

Accordingly, the inventors of this application made diligent studies into control mode switching apparatuses and control mode switching methods for continuing safe control, and arrived at the control mode switching apparatus and the control mode switching method described hereinafter.

A control mode switching apparatus according to one aspect of the present disclosure is a control mode switching apparatus that switches a control mode of a robot. The control mode includes at least two of a remote control mode in which the robot is controlled by a first user over an external network, a manual control mode in which the robot is controlled by being operated by a second user without using the external network, and an autonomous control mode in which the robot is controlled based on sensor information obtained by a sensor provided in the robot. The control mode switching apparatus includes: an obtainer that, based on a communication message on a control network in the robot and the control mode, obtains a detection result of detecting at least one anomaly among a user anomaly caused by control performed by the first user or the second user, a robot anomaly caused by the control network, an operating environment anomaly caused by an operating environment of the robot, and an application anomaly caused by an application run by a control device that is connected to the control network and that controls the robot; and a switcher that, based on the detection result obtained, calculates, for each of types of the at least one anomaly detected, a score indicating a likelihood that the type of the anomaly is a cause of the at least one anomaly occurring in the robot, and switches the control mode of the robot based on the score calculated.

Through this, the control mode can be switched according to the cause of the anomaly based on the anomaly detection result in the robot, which is effective in maintaining the safety of the robot. Accordingly, a control mode switching apparatus which enables safe control to be continued can be realized.

Additionally, for example, the sensor information may include at least one of location information, an acceleration, a travel speed, or a camera image from the robot. The user anomaly may be an anomaly in which one of the location information deviating from an anticipated range of control, the acceleration or the travel speed exceeding a predetermined threshold, or the robot making physical contact with or approaching an unanticipated person or object based on the camera image, is detected while the control mode is the manual control mode or the remote control mode. The robot anomaly may be an anomaly in which one of a notification of a malfunction included in communication information of the control network, or a communication anomaly in the control network, is detected. The operating environment anomaly may be an anomaly in which one of a discontinuous change or an invalid value in the location information, a communication anomaly in the external network, a voltage change in the control network, or disassembly of the robot, is detected.

Through this, an anomaly caused by a user, an anomaly caused by the robot, and an anomaly caused by the operating environment can be detected, which is effective in that the control mode can be switched appropriately according to the anomaly.

Additionally, for example, the types of the anomaly may include at least two of the user anomaly, the robot anomaly, the operating environment anomaly, and the application. The switcher may update the score of the user when the detection result includes detection of the user anomaly, update the score of the robot when the detection result includes detection of the robot anomaly, update the score of the operating environment when the detection result includes detection of the operating environment anomaly, and update the score of the application when the detection result includes detection of the application anomaly.

Through this, scores can be calculated for candidate causes of the anomaly based on the type of the detected anomaly, which is effective in that the control mode can be switched to an appropriate control mode based on the score.

Additionally, for example, updating the score may be reducing the score, and the switcher may further: calculate the score of the user for each of a plurality of first users each being the first user, and when the control mode is the remote control mode and an improper first user having a score of the user that has become less than or equal to a first threshold is controlling the robot, performs at least one of rejecting control by the improper first user, requesting a change to another first user, or switching the control mode to a control mode aside from the remote control mode; switch the control mode to a fail-safe mode in which control of the robot is limited and the robot is stopped in a safe state, when the score of the robot has become less than or equal to a second threshold; and issue an alert for confirming the operating environment to outside the control mode switching apparatus, when the score of the operating environment has become less than or equal to a third threshold.

Through this, the method for switching the control mode of the robot can be determined based on the value of the score and the current control mode, which is effective in realizing a safer robot.

Additionally, for example, when the scores of at least two of the types have become less than or equal to a predetermined threshold, the switcher may perform a response based on each score in an order of priority in which the score of the robot has a highest priority, the score of the operating environment has a next-highest priority, and the score of the user has a lowest priority.

Through this, an anomaly caused by a robot which is difficult to respond to safely simply by switching the control mode is responded to preferentially, which is effective in realizing a safety-oriented robot.

Additionally, for example, when the detection result includes detection of the user anomaly, and one of the score of the robot, the score of the operating environment, or the score of the application satisfies a predetermined condition, the switcher may skip updating the score of the user.

A user anomaly may be caused by another anomaly, i.e., a user anomaly may be detected even though the user is not the cause. A situation where the user's score is calculated lower in such cases can be suppressed. In other words, the user's score can be calculated more accurately.

Additionally, for example, the application may include a first application for the remote control mode, a second application for the manual control mode, and a third application for the autonomous control mode. The detection result may include an anomaly of the first application, an anomaly of the second application, and an anomaly of the third application as the application anomaly. The switcher may: reduce the score of the first application when the anomaly of the first application is detected, reduces the score of the second application when the anomaly of the second application is detected, and reduces the score of the third application when the anomaly of the third application is detected; prohibit the control mode from becoming the remote control mode when the score of the first application becomes less than or equal to a fourth threshold; prohibit the control mode from becoming the manual control mode when the score of the second application becomes less than or equal to a fifth threshold; and prohibit the control mode from becoming the autonomous control mode when the score of the third application becomes less than or equal to a sixth threshold.

Through this, anomalies within the robot can be classified in detail, which makes it possible to select an appropriate (e.g., safe) control mode to switch to, and is effective in improving the safety.

Additionally, for example, the switcher may determine whether the robot is in a predetermined control state based on at least one of the sensor information or a state of the robot, and switch the control mode only when the robot is in the predetermined control state.

Through this, the control mode can be switched while avoiding periods of control that would be problematic in terms of safety if the robot switches the control mode immediately. In other words, the control mode can be switched when the robot is in a safe state.

Additionally, for example, the switcher may switch the control mode only when the robot is present within a predetermined range based on the location information of the robot.

Through this, the control mode can be switched while avoiding periods of control in an area that would be problematic in terms of safety if the robot switches the control mode immediately. In other words, the control mode can be switched within a range in which the control mode can be switched safely.

Additionally, for example, the obtainer may be realized by an anomaly detector that detects at least one of the user anomaly, the robot anomaly, the operating environment anomaly, or the application anomaly based on the communication message and the control mode.

Through this, the processing for switching the control mode can be performed without obtaining a determination result from an external apparatus. For example, the processing for switching the control mode can be performed reliably even in poor communication environments.

Additionally, a control mode switching method according to one aspect of the present disclosure is a control mode switching method for switching a control mode of a robot. The control mode includes at least two of a remote control mode in which the robot is controlled by a first user over an external network, a manual control mode in which the robot is controlled by being operated by a second user without using the external network, and an autonomous control mode in which the robot is controlled based on sensor information obtained by a sensor provided in the robot. The control mode switching method includes: obtaining, based on a communication message on a control network in the robot and the control mode, a detection result of detecting at least one anomaly among a user anomaly caused by control performed by the first user or the second user, a robot anomaly caused by the control network, an operating environment anomaly caused by an operating environment of the robot, and an application anomaly caused by an application run by a control device that is connected to the control network and that controls the robot; and based on the detection result obtained, calculating, for each of types of the at least one anomaly detected, a score indicating a likelihood that the type of the at least one anomaly is a cause of the anomaly occurring in the robot, and switching the control mode of the robot based on the score calculated.

Through this, the same effects as those of the above-described control mode switching apparatus can be achieved.

Note that these comprehensive or specific aspects may be realized by a system, a method, an integrated circuit, a computer program, or a non-transitory computer-readable recording medium such as a CD-ROM, or may be implemented by any desired combination of systems, devices, methods, integrated circuits, computer programs, or recording media. The program may be stored in advance in a recording medium, or may be supplied to the recording medium via a wide-area communication network including the Internet.

A control mode switching apparatus and a control mode switching method according to an embodiment of the present disclosure will be described hereinafter with reference to the drawings. Note that the following embodiments describe preferred specific examples of the present disclosure. The numerical values, shapes, materials, constituent elements, arrangements and connection states of constituent elements, steps, orders of steps, and the like in the following embodiments are merely examples of the present disclosure, and are not intended to limit the present disclosure. The present disclosure is specified based on the content of the scope of claims. Accordingly, of the constituent elements in the following embodiments, constituent elements not denoted in the independent claims, which indicate the broadest interpretation of the present disclosure, are not absolutely necessary for solving the problem of the present disclosure, and will instead be described as constituent elements constituting more preferred forms.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, terms indicating relationships between elements, such as "the same", numerical values, and numerical value ranges do not express the items in question in the strictest sense, and also include substantially equivalent ranges, e.g., differences of approximately several percent (e.g., approximately 10%), as well.

EMBODIMENT

A control mode switching apparatus and a control mode switching method which switch control modes of a robot, the robot being capable of being controlled by a control device that performs the control remotely, autonomously, or manually, will be described hereinafter.

1.1 Overall Configuration of Robot Monitoring System

FIG. 1 is an overall block diagram illustrating a robot monitoring system according to the present embodiment. The robot monitoring system in FIG. 1 includes robot 10a, robot 10b, robot 10c, network 20, fleet management server 30, monitoring server 40, and remote control terminal 50.

Robots 10a, 10b, and 10c are robots which perform predetermined tasks in a region including a public place such as a public road or the like, and are exemplified by, but are not limited to, self-driving trucks, autonomous delivery robots, and the like. Robots 10a, 10b, and 10c are mobile bodies capable of operating in at least two control modes. The control modes of robots 10a, 10b, and 10c include at least two of the following: a remote control mode in which the robot is controlled by a first user over an external network; a manual control mode in which the robot is controlled by being operated by a second user without using the external network (e.g., operated manually); and an autonomous control mode in which robots 10a, 10b, and 10c are controlled based on sensor information obtained by sensors provided in the respective robots. In the present embodiment, robots 10a, 10b, and 10c have three modes, namely the remote control mode, the manual control mode, and the autonomous control mode.

Robots 10*a*, 10*b*, and 10*c* communicate robot states such as control states, location information, security alerts, and the like of the robots to fleet management server 30 and monitoring server 40 over network 20. Robots 10*a*, 10*b*, and 10*c* have the same configuration, and may therefore be collectively referred to as "robots 10".

Network 20 communicably (e.g., capable of wireless communication) connects robot 10*a*, robot 10*b*, robot 10*c*, fleet management server 30, monitoring server 40, and remote control terminal 50 to each other. Network 20 can include the Internet or a dedicated line. Network 20 is a network which connects robots 10 to devices external to robots 10, and is an example of the external network.

Fleet management server 30 receives the robot states of robots 10 from robots 10, and provides, to a manager of robots 10, an interface for managing whether robots 10 are operating properly. Monitoring server 40 is a server which primarily monitors robots 10 for security incidents, receiving security alerts from robots 10 and providing, to a security operations center or a security incident response team, an interface for analysis and response.

Note that an interface for remotely controlling robots 10 may be provided from fleet management server 30.

Remote control terminal 50 is an information processing apparatus for remotely operating robots 10 which are operating in remote operation mode. Remote control terminal 50 remotely operates robots 10 by generating control signals based on inputs from a remote operator (e.g., accelerator position, brake pressure, steering angle, and the like) and transmitting the control signals to robots 10 over network 20. Note that the remote operator may remotely manage robots 10, for example. The remote operator is an example of the first user. The control mode in which the remote operator controls robots 10 over network 20 is an example of the remote control mode.

1.2 Robot Network Configuration

Figure 2:
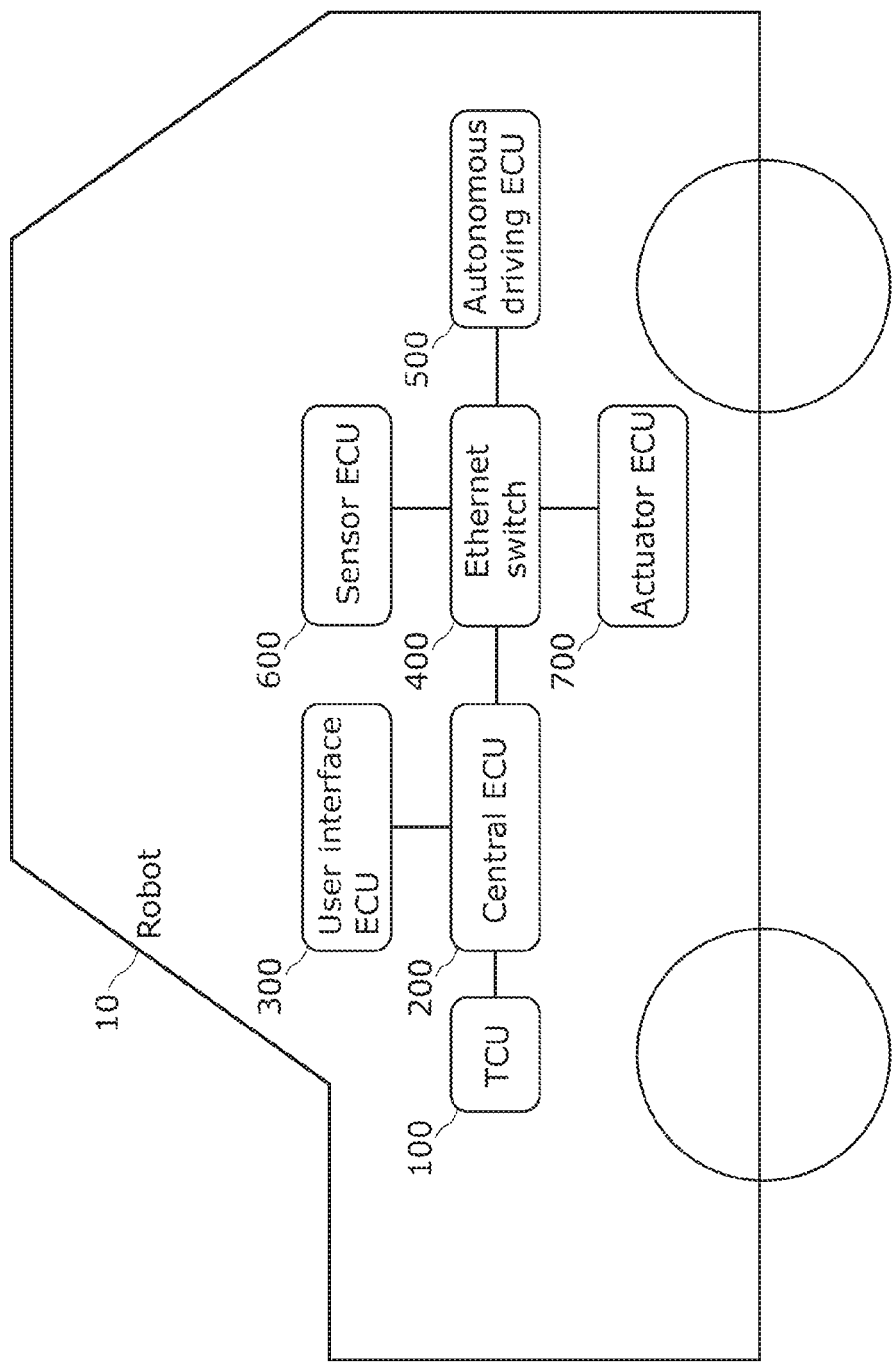
FIG. 2 is a block diagram illustrating a robot network installed in a robot according to an embodiment.

FIG. 2 is a block diagram illustrating a robot network system installed in robots 10 according to the present embodiment. In FIG. 2, the robot network system (robot network) includes Telematic Control Unit (TCU) 100, central Electronic Control Unit (ECU) 200, user interface ECU 300, Ethernet switch 400, autonomous driving ECU 500, sensor ECU 600, and actuator ECU 700. Although not shown in FIG. 2, the robot network can include more ECUs. The robot network system is an example of a control system. Furthermore, information transmitted and received within the robot network system is an example of a communication message.

Each ECU is a device that includes, for example, a processor (a microprocessor), digital circuitry such as memory, analog circuitry, communication circuitry, and the like. The memory is Read-Only Memory (ROM), Random Access Memory (RAM), or the like, which can store a control program (computer program) executed by the processor. For example, the processor realizes various functions of the ECU by operating in accordance with the control program. The computer program is configured by combining a plurality of command codes for the processor to realize a predetermined function.

Although the present embodiment describes an example in which each device is connected by and communicates through Ethernet (an Ethernet network built in compliance with Ethernet), the robot network is not limited to Ethernet (an Ethernet network). The robot network may be, for example, a Controller Area Network (CAN) (a CAN network), or may be a network using FlexRay, a dedicated communication line, or wireless communication. The robot network is a network from network 20, and is a control network (in-vehicle control network) provided within (physically within) robot 10 for controlling robot 10.

TCU 100 includes a communication interface for a network outside robots 10 (the external network), and has a function for communicating analysis reports and the like, communicated from central ECU 200, to fleet management server 30 and monitoring server 40 over network 20.

Central ECU 200 is an ECU which plays a central role for robot 10, and realizes functions of robot 10 by running a variety of applications.

Central ECU 200 determines whether to put the control mode of robot 10 into remote control, autonomous control, or manual control.

Central ECU 200 has a function for estimating the cause of an anomaly that has occurred in robot 10 by detecting the anomaly that has occurred in robot 10 and analyzing the anomaly that has occurred, and then switching to a safe control mode according to the current control state of robot 10. For example, central ECU 200 may estimate the cause of the anomaly based on a table in which the anomaly that has occurred (the anomaly that has been detected) and the cause of that anomaly are associated with each other.

Additionally, central ECU 200 determines the control state of robot 10 based on information on the control network, included in an Ethernet frame received from Ethernet switch 400, and communicates, to TCU 100, information for making a notification to fleet management server 30.

Additionally, central ECU 200 communicates, to TCU 100, information for notifying monitoring server 40 of the anomaly that has occurred in robot 10.

Central ECU 200 is an example of a control mode switching apparatus.

User interface ECU 300 accepts operations by a user from a user interface for controlling robot 10, mainly when in manual control mode, and communicates, to central ECU 200, operation details for controlling robot 10, e.g., operation details for controlling steering, acceleration/deceleration, and the like. Devices such as an operation device, a touch panel, a USB port, a Wi-Fi (registered trademark; the same applies hereinafter) module, and the like can be given as examples of the user interface. Note that the user is an example of a second user. Additionally, the control performed through user interface ECU 300 is an example of control by an operation that does not use network 20. Furthermore, the control mode in which robot 10 is controlled by the user through user interface ECU 300 (e.g., direct control) is an example of a manual control mode.

Ethernet switch 400 is connected by Ethernet to central ECU 200, autonomous driving ECU 500, and actuator ECU 700, and transfers Ethernet frames (an example of a communication message) transmitted from the respective devices to be delivered to the appropriate devices.

Autonomous driving ECU 500 realizes control of robot 10 by making actuator control commands to actuator ECU 700 using sensor information included in the Ethernet frames obtained by sensor ECU 600, mainly when robot 10 is in autonomous control mode.

Sensor ECU 600 is connected to, for example, a camera that shoots images of the periphery of robot 10, millimeter wave radar that detects objects in the periphery of robot 10, a speed sensor, an acceleration sensor, or a Global Positioning System (GPS), and communicates various types of information, included in Ethernet frames, to other devices via Ethernet switch 400. For example, the sensor information includes at least one of location information, acceleration, travel speed, or a camera image from robot 10.

Actuator ECU 700 controls actuators involved in driving/controlling robot 10, e.g., motors and engines for traveling/flying, steering for turning and changing directions, and the like.

Although the present embodiment describes an example in which only one each of sensor ECU 600 and actuator ECU 700 are present, a plurality of sensor ECUs or a plurality of actuator ECUs may be present in the robot network.

1.3 TCU Configuration

Figure 3:
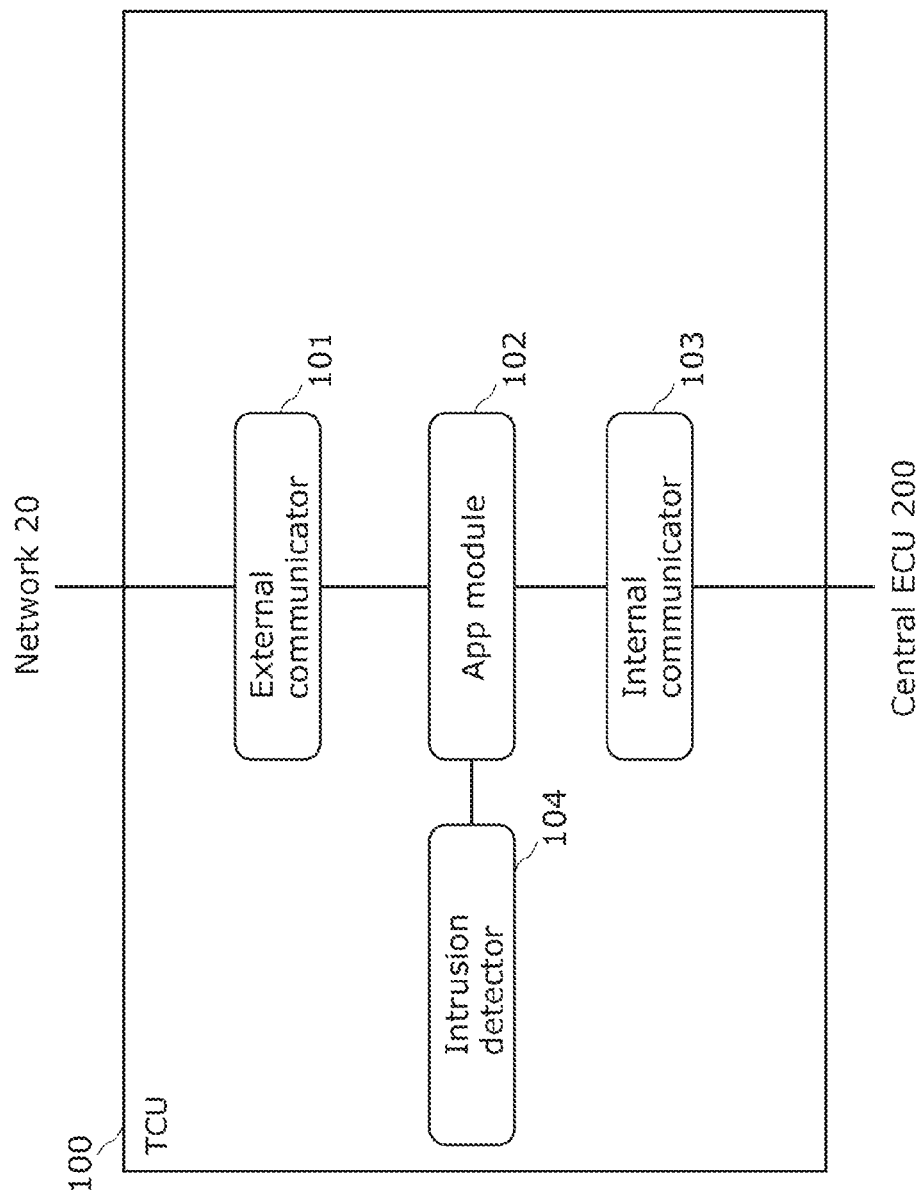
FIG. 3 is a block diagram illustrating a Telematic Control Unit (TCU) according to an embodiment.

FIG. 3 is a block diagram illustrating TCU 100 according to the present embodiment. In FIG. 3, TCU 100 includes external communicator 101, app module 102, internal communicator 103, and intrusion detector 104.

External communicator 101 is a communication interface with network 20, communicating with fleet management server 30 and monitoring server 40 and exchanging information with app module 102 about the communication content.

App module 102 runs an application for notifying fleet management server 30 or monitoring server 40 of information about the state of robot 10, and an application for transmitting data to central ECU 200 based on data received from network 20.

Internal communicator 103 connects to central ECU 200 and exchanges Ethernet frames with app module 102.

Intrusion detector 104 is an Intrusion Detection System (IDS), and monitors the behavior of app module 102 to determine if an application is behaving improperly. For example, intrusion detector 104 monitors the application Central Processing Unit (CPU) or memory resource usage, communication volume, communication destinations, file access permissions, improper process launches, and the like, and determines if these are within standard values. Intrusion detector 104 also monitors whether external communicator 101 is communicating with an improper access destination, whether malware is included in communication frames, whether the communication volume has increased above a normal value, and the like. If anomalous behavior is observed, intrusion detector 104 makes a security alert transmission request to app module 102 for communicating a security alert, and notifies central ECU 200 of a security anomaly.

1.4 Central ECU Configuration

Figure 4:
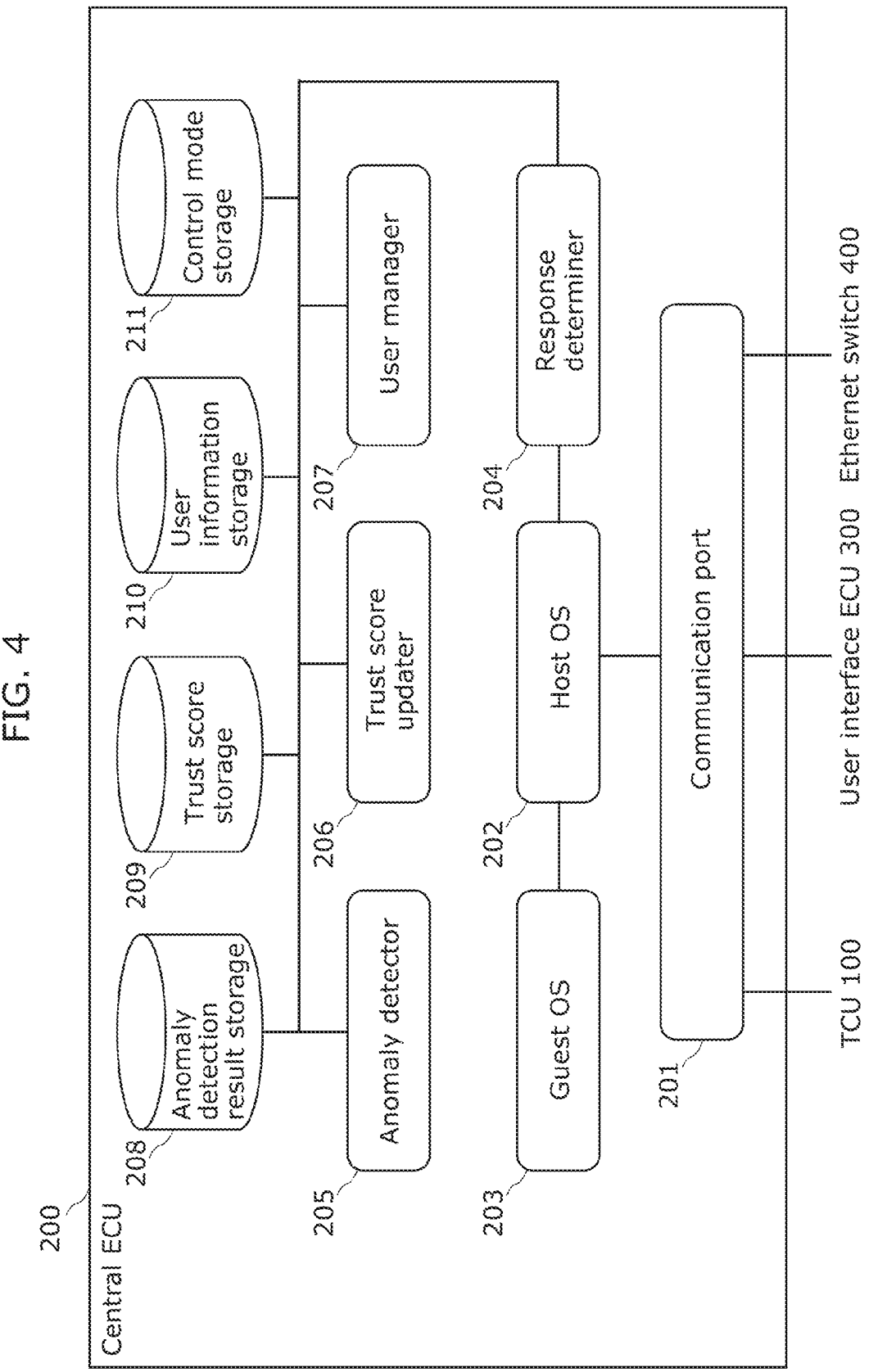
FIG. 4 is a block diagram illustrating a central Electronic Control Unit (ECU) according to an embodiment.

FIG. 4 is a block diagram illustrating central ECU 200 according to the present embodiment. In FIG. 4, central ECU 200 includes communication port 201, host operating system (OS) 202, guest OS 203, response determiner 204, anomaly detector 205, trust score updater 206, user manager 207, anomaly detection result storage 208, trust score storage 209, user information storage 210, and control mode storage 211.

Communication port 201 is connected to and communicates with each of TCU 100, user interface ECU 300, and Ethernet switch 400. In addition, communication port 201 has a function of forwarding communication to the appropriate network according to the communication content. Communication port 201 also transmits and receives information to and from host OS 202.

Host OS 202 is the main operating system (OS) of central ECU 200, exchanging information with communication port 201 and notifying guest OS 203 of the communication content. Host OS 202 also notifies response determiner 204 of the communication content in the same manner.

Host OS 202 periodically notifies fleet management server 30 and monitoring server 40 of the state of robot 10. The state of robot 10 can include location information, control mode, user information, anomaly detection results, and the like.

Guest OS 203 is an OS on which applications of central ECU 200 run. The applications of central ECU 200 are, for example, a manual control application (manual control app) that makes a transmission request to Ethernet switch 400 for control instructions for controlling robot 10 based on user control information received from user interface ECU 300, a remote control application (remote control app) that makes a transmission request to Ethernet switch 400 for control instructions for controlling robot 10 based on remote user control information received from TCU 100, and the like. Guest OS 203 is an example of a control device that is connected to the robot network and that controls robot 10. The control device is provided in robot 10.

Response determiner 204 stores security alerts received from the robot network in anomaly detection result storage 208.

When an anomaly occurs in robot 10, response determiner 204 performs processing, based on a trust score stored in trust score storage 209 and the control mode of robot 10 stored in control mode storage 211 (e.g., the current control mode), for switching to a control mode in which safe control can be continued. Response determiner 204 determines to switch to a control mode in which safe control can be continued, for example, when an anomaly occurs in robot 10. Response determiner 204 switches the control mode of the robot based on a trust score calculated (updated) by trust score updater 206. Specifically, when the trust score calculated becomes less than or equal to a predetermined value, response determiner 204 changes the control mode of control mode storage 211 according to a type of the trust score that has become less than or equal to the predetermined value and the current control mode. Note that the trust score is an example of a score indicating a likelihood of the cause of the anomaly that has occurred. Additionally, changing the control mode of control mode storage 211 is an example of switching the control mode.

Anomaly detector 205 monitors applications running on guest OS 203, and monitors for anomalous control based on frames, on the control network, which have been received from communication port 201. The frames are an example of a communication message.

In monitoring the applications of guest OS 203, anomaly detector 205 monitors for whether an application is performing improper behavior. For example, anomaly detector 205 monitors the application CPU or memory resource usage, communication volume, communication destinations, file access permissions, improper process launches, and the like, and determines if these are within standard values.

In monitoring for anomalous control, anomaly detector 205 detects anomalous behavior related to dangerous control, suspicious control, and the like of robot 10.

The following can be given as examples of anomalous behavior: acceleration exceeding a threshold; activation of safety mechanisms such as an emergency brake or the like; physical contact with a person or an object which robot 10 is not expected to make or robot 10 approaching a person or an object at a distance less than or equal to a threshold; robot 10 deviating from a pre-set operation route; GPS signal inconsistencies; tampering with robot 10; disassembling robot 10; connecting an improper device to user interface ECU 300; and the like. Tampering with robot 10 is, for example, tapping into an internal network (robot network).

Anomalous behavior may additionally include user authentication failure, communication message authentication failure, a notification of ECU malfunction information, and the like.

Anomaly detector 205 records the detected anomaly in anomaly detection result storage 208 along with an anomaly detection time, and notifies trust score updater 206 and response determiner 204 that an anomaly has been detected.

The anomalies detected by anomaly detector 205 will be described here. Through the above-described monitoring and the like, anomaly detector 205 detects at least one anomaly among a user anomaly caused by control performed by the first user or the second user, a robot anomaly caused by the control network, an operating environment anomaly caused by an operating environment of robot 10, and an application anomaly caused by an application run by a control device that is connected to the control network and that controls robot 10. Anomaly detector 205 detects the one anomaly based on, for example, a communication message on the control network in robot 10 and the current control mode of robot 10.

The user anomaly is an anomaly in which one of the location information deviating from an anticipated range of control, the acceleration or the travel speed exceeding a predetermined threshold, or the robot making physical contact with or approaching an unanticipated person or object based on a camera image, is detected while the control mode is the manual control mode or the remote control mode.

The robot anomaly is an anomaly in which one of a notification of a malfunction included in communication information of the control network, or a communication anomaly in the control network, is detected.

The operating environment anomaly is an anomaly in which one of a discontinuous change or an invalid value in the location information of robot 10, a communication anomaly in the external network, a voltage change in the control network, or the disassembly of robot 10, is detected.

Note that anomaly detector 205 is an example of an obtainer that obtains an anomaly by detecting the anomaly. In other words, the obtainer is realized by anomaly detector 205, which detects at least one of the user anomaly, the robot anomaly, the operating environment anomaly, or the application anomaly based on the communication message and the control mode.

Although anomaly detector 205 is provided within central ECU 200 in the present embodiment, the functions of anomaly detector 205 may be distributed within robot 10, or may be provided in fleet management server 30 or monitoring server 40. In this case, communication port 201 is an example of an obtainer that obtains a detection result from fleet management server 30 or monitoring server 40 via TCU 100.

Trust score updater 206 calculates a trust score of a subject conceivable as the cause of the anomaly based on the anomaly detection result stored in anomaly detection result storage 208 and the control mode stored in control mode storage 211. An app (application), a user, a robot, communication, and the operating environment can be given as examples of the subject conceivable as the cause of the anomaly. The app, the user, the robot, the communication, and the operating environment are examples of anomaly subjects (types of anomalies).

The trust score is calculated for each application, each user, each device within robot 10, each communication path, and each operating environment. For example, when only improper control corresponding to deviation from a route while robot 10 is being controlled remotely is detected, trust score updater 206 reduces the trust score of the user controlling robot 10 under the assumption that the user remotely controlling robot 10 cannot be trusted. When a GPS signal inconsistency is detected in addition to improper control corresponding to a route deviation is detected, trust score updater 206 reduces the trust score of the environment in which robot 10 is operating, and reduces the trust score of the subject that is the cause of the anomaly being detected in robot 10. Trust score updater 206 may reduce the trust score of the subject that is the cause of the anomaly in robot 10, i.e., the trust score of the subject of the anomaly corresponding to the detected anomaly, based on a table in which the detected anomaly is associated with the subject of the anomaly to be reduced for that anomaly.

In this manner, trust score updater 206 calculates the trust score, and when the calculated trust score has dropped below a predetermined value, notifies response determiner 204 that there is a high risk in continuing to control robot 10 in the current mode. Trust score updater 206 can also be said to calculate, based on the anomaly detection result, the trust score for each of anomaly subjects that have been classified based on the detected anomaly.

Although the foregoing describes an example in which trust score updater 206 reduces the trust score when an anomaly is detected, the configuration is not limited thereto, and the trust score may be increased.

Note that a switcher is constituted by the above-described response determiner 204 and trust score updater 206.

User manager 207 manages users who are logged in to robot 10. A plurality of users can log in to robot 10, and the logged-in users can use applications of robot 10. Each user is given permissions for controlling, monitoring, and managing robot 10 in advance.

A user who is logged in to robot 10 and has been given control permissions can remotely control robot 10, and a user who is logged in to robot 10 and has been given monitoring permissions can access sensor information (e.g., camera images) of robot 10.

Additionally, a user who is logged in to robot 10 and has been given manager permissions can, in addition to the control permissions and the monitoring permissions, read the anomaly detection results stored in anomaly detection result storage 208, the trust scores stored in trust score storage 209, the user information stored in user information storage 210, and information on the control modes stored in control mode storage 211.

User manager 207 authenticates users who log in to robot 10, and updates the user information stored in user information storage 210 along with the user's permissions.

Anomaly detection results related to robot 10 are stored in anomaly detection result storage 208. The anomaly detection results stored in anomaly detection result storage 208 will be described in detail later with reference to FIG. 12.

A trust score held for each subject that can be a cause of an anomaly, i.e., information such as the likelihood that the subject is the cause of the anomaly, the magnitude of the risk, and the like, is held in trust score storage 209 based on the anomaly detection results stored in anomaly detection result storage 208 and the control mode stored in control mode storage 211. The trust score stored in trust score storage 209 will be described in detail later with reference to FIG. 13.

Information on the users logged in to robot 10 is stored in user information storage 210. The user information stored in user information storage 210 will be described in detail later with reference to FIG. 14.

The current control mode of robot 10 is stored in control mode storage 211. The control mode stored in control mode storage 211 will be described in detail later with reference to FIG. 15.

1.5 Block Diagram of User Interface ECU

Figure 5:
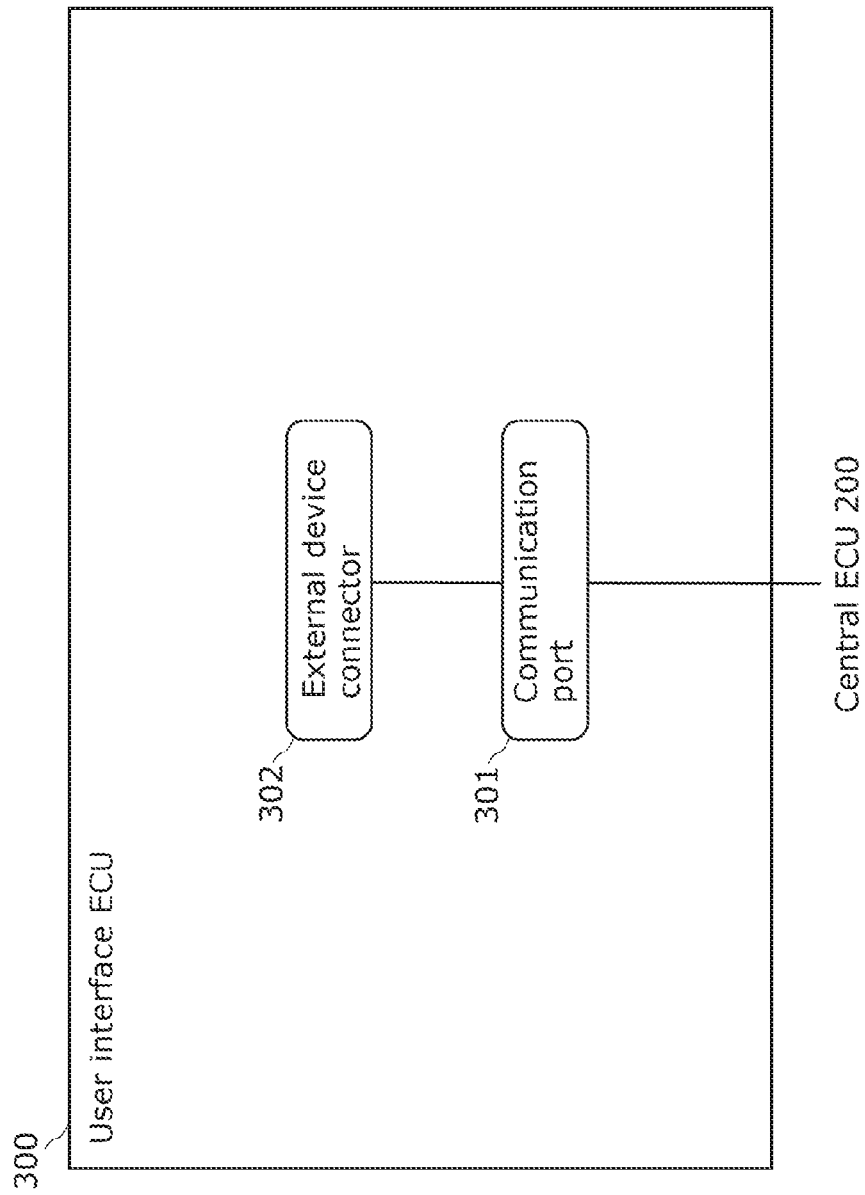
FIG. 5 is a block diagram illustrating a user interface ECU according to an embodiment.

FIG. 5 is a block diagram illustrating user interface ECU 300 according to the present embodiment. In FIG. 5, user interface ECU 300 includes communication port 301 and external device connector 302.

Communication port 301 is connected to central ECU 200, and exchanges messages with central ECU 200. Communication port 301 is mainly responsible for communicating, to central ECU 200, control information which has been received from external device connector 302.

External device connector 302 connects to a device operated by a user who is manually controlling robot 10, or to an interface of the device. A steering wheel, controllers, switches, touch panels, and the like can be given as examples of external connected devices. USB ports, Wi-Fi modules, diagnostic ports, communication interfaces such as Bluetooth (registered trademark), and the like can be given as examples of external connected device interfaces.

1.6 Block Diagram of Ethernet Switch

Figure 6:
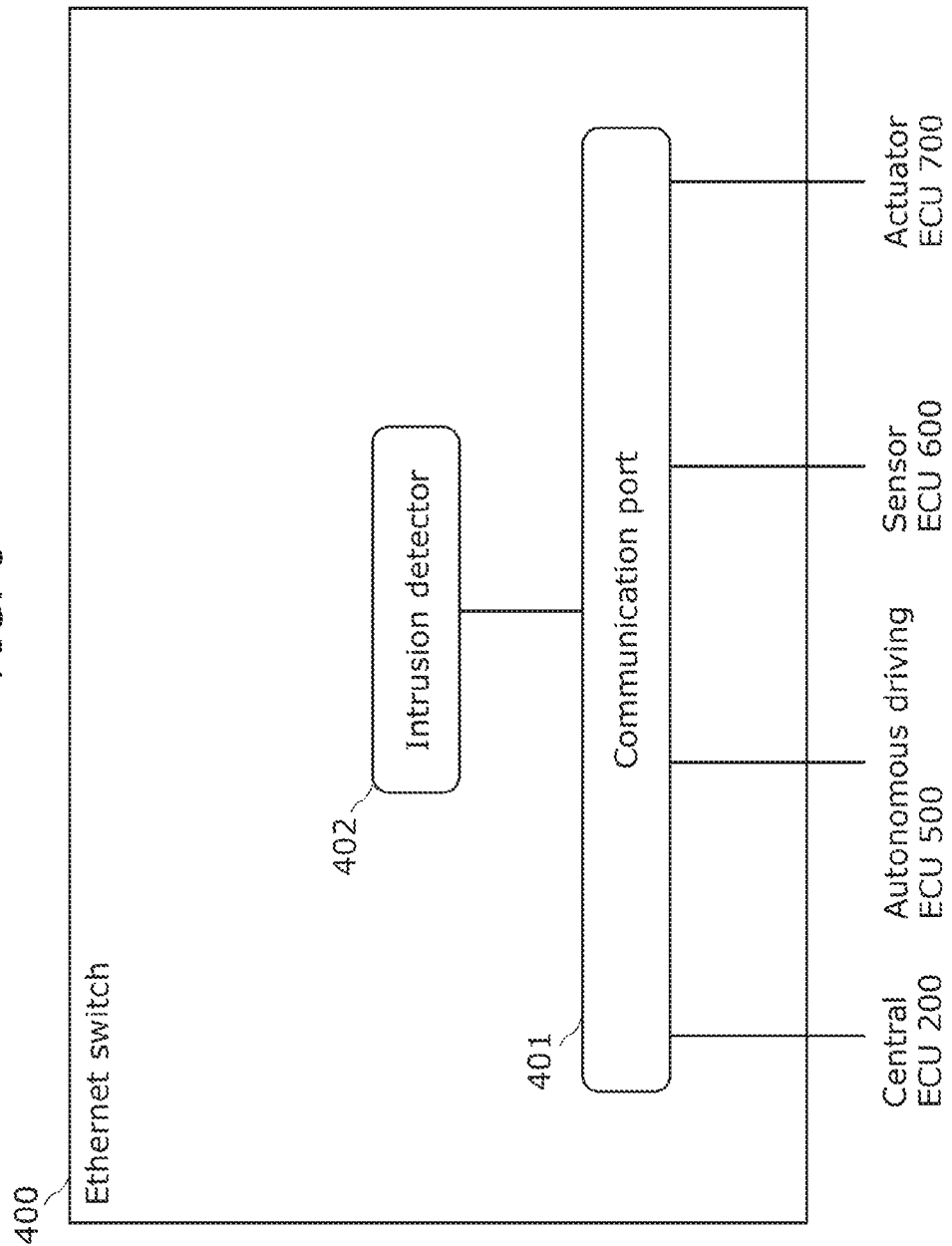
FIG. 6 is a block diagram illustrating an Ethernet (registered trademark; the same applies hereinafter) switch according to an embodiment.

FIG. 6 is a block diagram illustrating Ethernet switch 400 according to the present embodiment. In FIG. 6, Ethernet switch 400 includes communication port 401 and intrusion detector 402.

Communication port 401 includes four physical ports, with the four physical ports being connected to central ECU 200, autonomous driving ECU 500, sensor ECU 600, and actuator ECU 700, respectively, and transferring frames according to the content of received frames.

Each of the four physical ports communicates frames to intrusion detector 402 in order to monitor the received frames.

Intrusion detector 402 is a network Intrusion Detection System (IDS) that monitors the frames communicated from communication port 401 and confirms whether improper communication is occurring.

When improper communication is determined to be occurring, intrusion detector 402 generates a security alert, makes a transmission request for the security alert to communication port 401, and communicates the security alert to central ECU 200.

Improper communication can be detected when an address aside from a pre-set address is used, when there is an anomalous communication volume, and when the communication pattern matches a predetermined attack pattern.

1.7 Block Diagram of Autonomous Driving ECU

Figure 7:
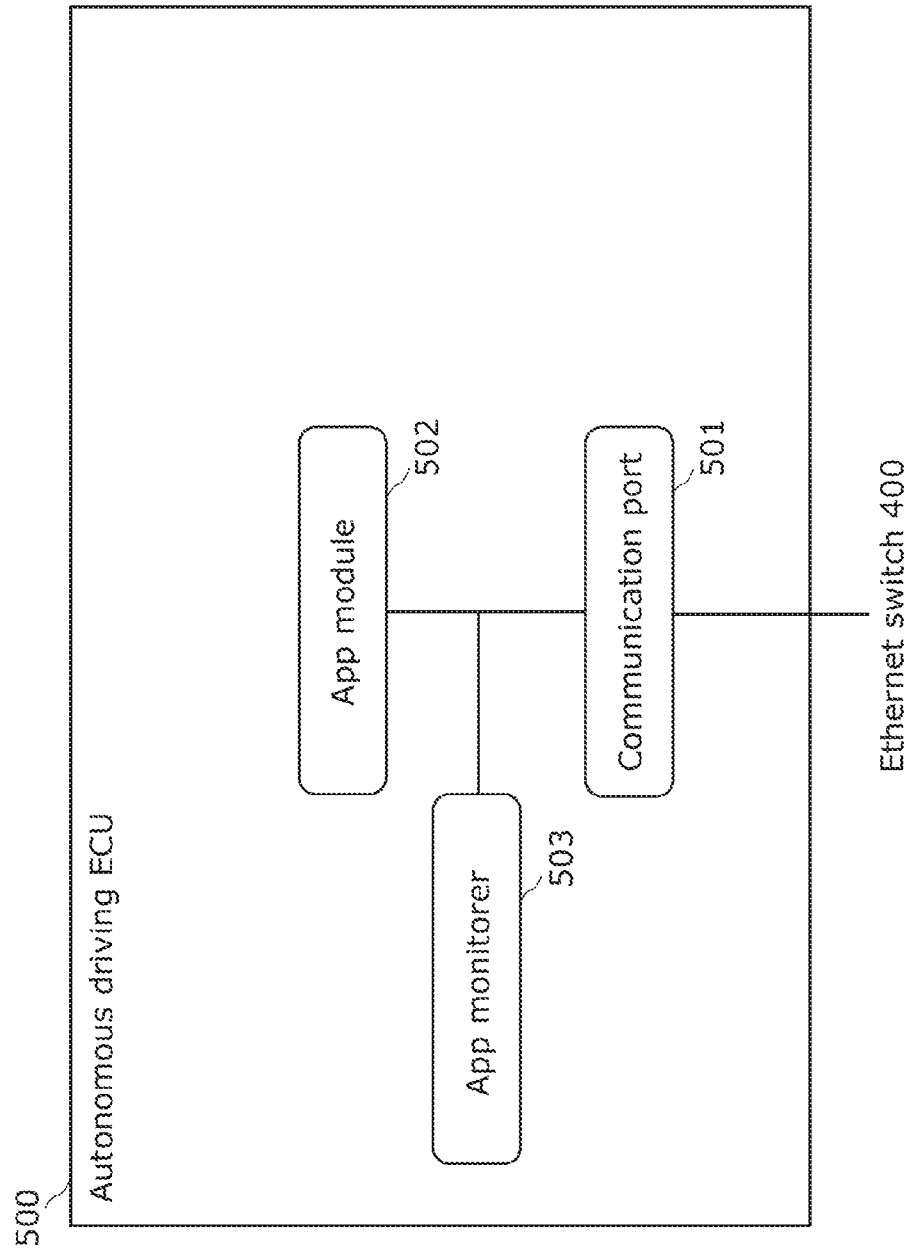
FIG. 7 is a block diagram illustrating an autonomous driving ECU according to an embodiment.

FIG. 7 is a block diagram illustrating autonomous driving ECU 500 according to the present embodiment. In FIG. 7, autonomous driving ECU 500 includes communication port 501, app module 502, and app monitorer 503.

Communication port 501 is a communication interface, connected to Ethernet switch 400, that transmits and receives frames.

App module 502 runs an autonomous control application, which runs when the control mode of robot 10 is the autonomous control mode. The autonomous control application transmits frames of control instructions for actuators to actuator ECU 700 based on sensor values received from sensor ECU 600.

App monitorer 503 monitors the behavior of app module 502 and detects events related to security, such as the execution of improper processes, the detection of anomalous resource usage, diagnostic command access errors, failed authentication of message authentication code included in frames, and the like.

When an improper security event is detected, app monitorer 503 generates a security alert, makes a transmission request for the security alert to communication port 501, and communicates the security alert to central ECU 200.

1.8 Block Diagrams of Sensor ECU and Actuator ECU

The configurations of sensor ECU 600 and actuator ECU 700 will be described next. The configuration of actuator ECU 700 is basically the same as the configuration of sensor ECU 600 and will therefore not be described. Although the configuration is the same as sensor ECU 600, note that actuator ECU 700 has a different functional configuration.

Figure 8:
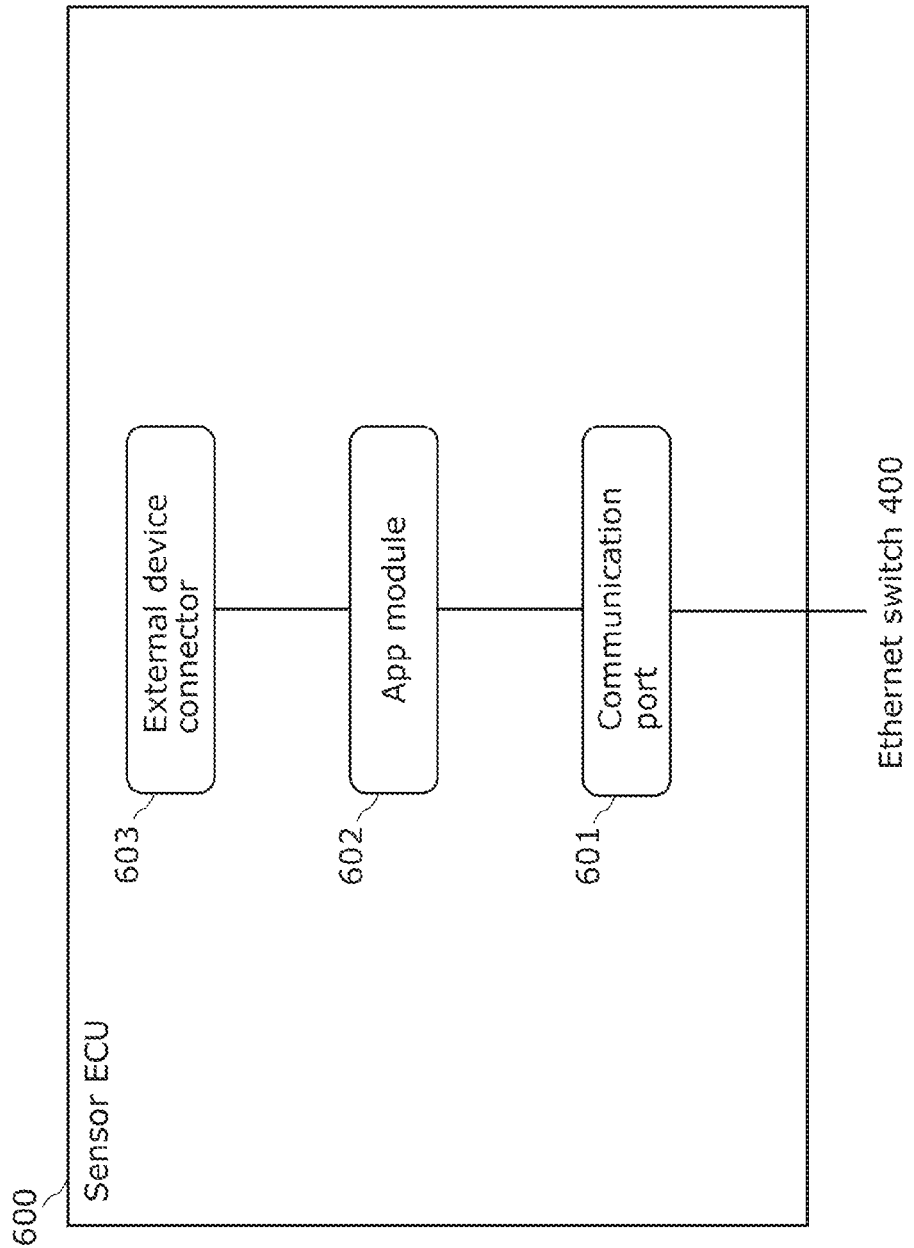
FIG. 8 is a block diagram illustrating a sensor ECU according to an embodiment.

FIG. 8 is a block diagram illustrating sensor ECU 600 according to the present embodiment. In FIG. 8, sensor ECU 600 includes communication port 601, app module 602, and external device connector 603.

Communication port 601 is a communication interface with Ethernet switch 400.

App module 602 configures sensor information communicated from external device connector 603 as an Ethernet frame and makes a transmission request to communication port 601. In the case of actuator ECU 700, app module 602 controls actuators connected to external device connector 603 based on the sensor information communicated from sensor ECU 600, control instructions communicated from central ECU 200 or autonomous driving ECU 500, and the like.

External device connector 603 is connected to sensors, installed in robot 10, which monitor (e.g., measure) the surrounding environment and the state of robot 10, and receives sensor information (e.g., measurement results). The sensors are, for example, a travel speed sensor, an accelerometer, a yaw rate sensor, a GPS, a camera, LiDAR, millimeter wave radar, and the like. In the case of actuator ECU 700, external device connector 603 is connected to actuators which control robot 10. The actuators are, for example, motors, engines, handles, and the like.

1.9 Block Diagram of Fleet Management Server

Figure 9:
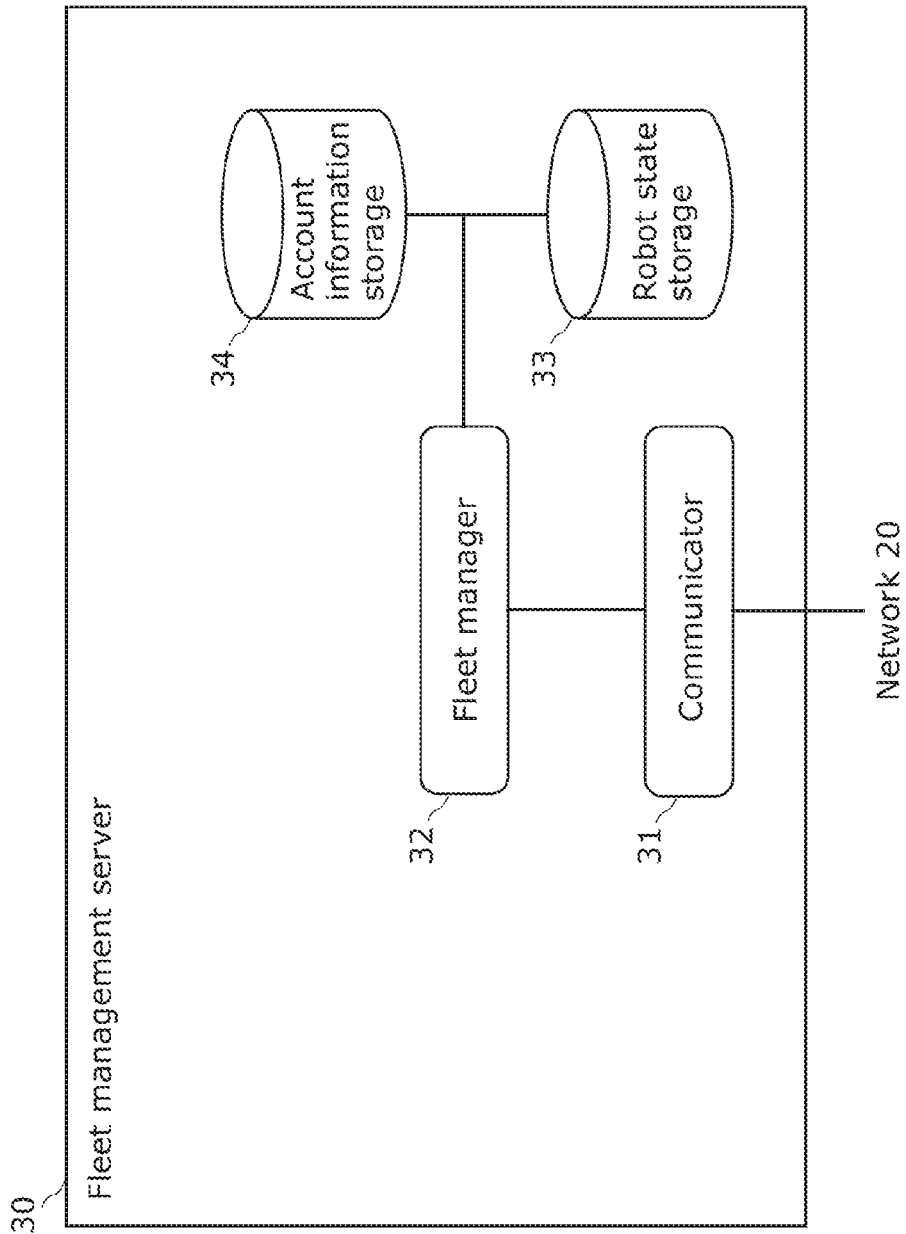
FIG. 9 is a block diagram illustrating a fleet management server according to an embodiment.

FIG. 9 is a block diagram illustrating fleet management server 30 according to the present embodiment. In FIG. 9, fleet management server 30 includes communicator 31, fleet manager 32, robot state storage 33, and account information storage 34.

Communicator 31 is connected to network 20, and is a communication interface which communicates with robot 10 and monitoring server 40.

Fleet manager 32 manages information on robot 10 received from communicator 31. Fleet manager 32 updates the state of robot 10 stored in robot state storage 33 in accordance with the control state of robot 10, received from communicator 31.

Fleet manager 32 also receives information on the users logged in to robot 10 from robot 10 and updates the account information held in account information storage 34.

The state of robot 10 is stored in robot state storage 33. The robot state stored in robot state storage 33 will be described in detail later with reference to FIG. 16.

Account information storage 34 stores information on users who can access robot 10. The account information stored in account information storage 34 will be described in detail later with reference to FIG. 17.

1.10 Block Diagram of Monitoring Server

Figure 10:
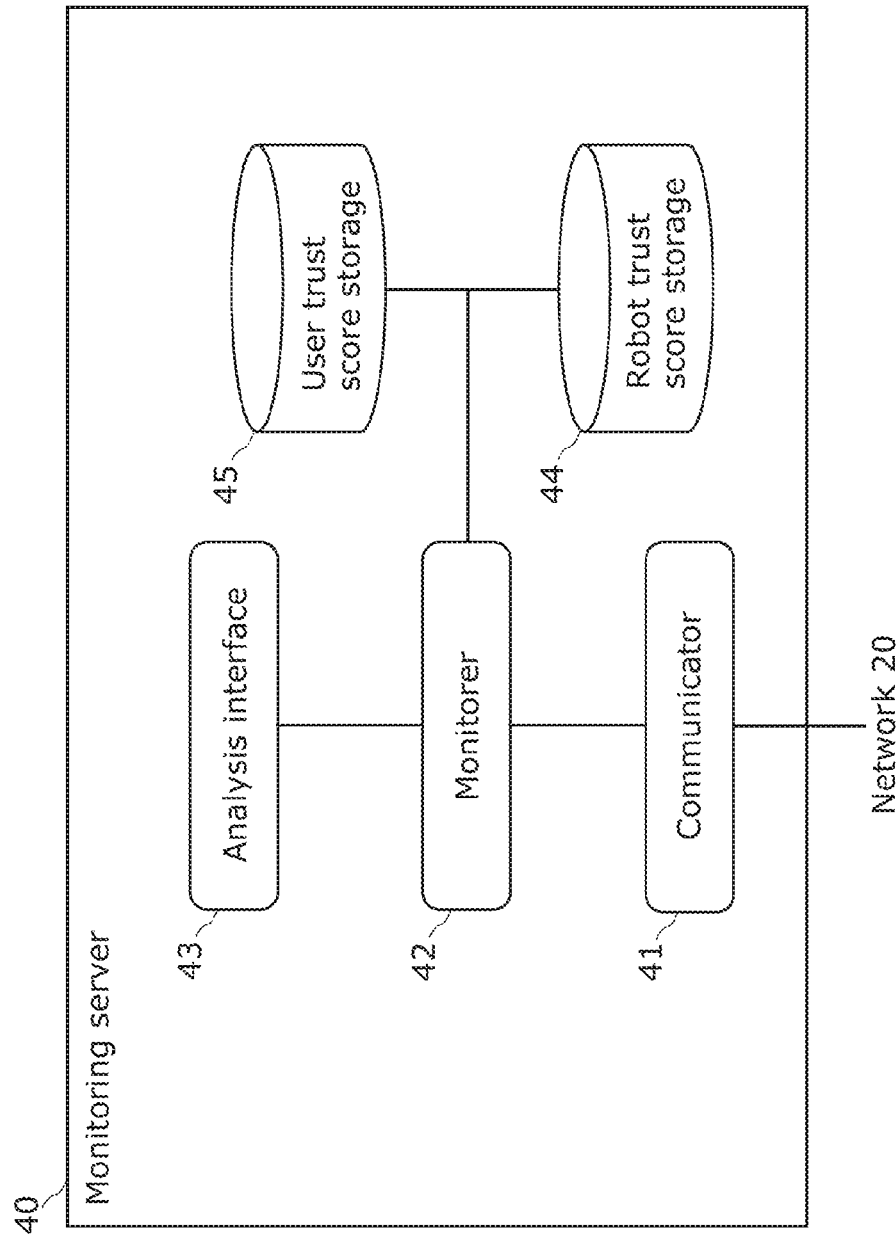
FIG. 10 is a block diagram illustrating a monitoring server according to an embodiment.

FIG. 10 is a block diagram illustrating monitoring server 40 according to the present embodiment. In FIG. 10, monitoring server 40 includes communicator 41, monitorer 42, analysis interface 43, robot trust score storage 44, and user trust score storage 45.

Communicator 41 is connected to network 20, and is a communication interface which communicates with robot 10 and fleet management server 30.

Monitorer 42 monitors whether a security incident has occurred in the robot based on the state of robot 10, security alerts, and the like communicated from robot 10. Monitorer 42 also updates the trust score of robot 10 stored in robot trust score storage 44 and the trust score of the users stored in user trust score storage 45 based on the trust scores communicated from robot 10.

Analysis interface 43 is an analysis interface for communicating a report on a security incident that has occurred to a security operations center or a security incident response team, or for a security analyst to make a detailed analysis, when such a security incident occurs.

Robot trust score storage 44 stores the trust score related to robot 10, based on the trust score communicated from robot 10. The trust score of the robot, stored in robot trust score storage 44, will be described in detail later with reference to FIG. 18.

User trust score storage 45 stores the trust score related to the user, based on the trust score communicated from robot 10. The trust score of the user, stored in user trust score storage 45, will be described in detail later with reference to FIG. 19.

1.11 Block Diagram of Remote Control Terminal

FIG. 11 is a block diagram illustrating remote control terminal 50 according to the present embodiment. In FIG. 11, remote control terminal 50 includes communicator 51, remote control app module 52, and user interface 53.

Communicator 51 is connected to network 20, and is a communication interface which communicates with robot 10 and fleet management server 30.

Remote control app module 52 is an application for remotely controlling robot 10, receiving the user's operation details from user interface 53 and communicating control details to robot 10 via communicator 51.

User interface 53 provides an interface for the user to control robot 10. User interface 53 is, for example, an interface for a user implemented by a touch panel, a controller, or the like.

1.12 Example of Anomaly Detection Result

FIG. 12 is a diagram illustrating an example of the anomaly detection result according to the present embodiment. The anomaly detection result illustrated in FIG. 12 is stored in anomaly detection result storage 208. The anomaly detection result is not only updated by anomaly detector 205 of central ECU 200, but can also be updated by a security alert communicated from one of intrusion detector 104 of TCU 100, intrusion detector 402 of Ethernet switch 400, or app monitorer 503 of autonomous driving ECU 500 within robot 10. The anomaly detection result can also be updated by a message or the like communicating a malfunction in robot 10.

In FIG. 12, anomaly detection content, a time (e.g., an occurrence time), and a detecting device (e.g., the device that detected the anomaly) are stored in association with each other as the anomaly detection result. Here, the time may be a system time measured internally by central ECU 200, or may be a time included in the security alert.

FIG. 12 indicates that at 10:50:20, a route deviation anomaly was detected by central ECU 200; at 10:45:30, emergency brake activation was detected by central ECU 200; and at 10:45:29, sudden acceleration/deceleration was detected by central ECU 200.

Although the present embodiment describes an example in which the anomaly detection result holds an anomaly detected within robot 10, the anomaly need not be detected within robot 10. For example, when an anomaly in robot 10 is detected by fleet management server 30, the anomaly detection result may be updated by fleet management server 30 communicating a security alert to robot 10. Similarly, the anomaly detection result may be updated based on a security alert communicated from monitoring server 40.

1.13 Example of Trust Score

FIG. 13 is a diagram illustrating an example of the trust score according to the present embodiment. The trust score illustrated in FIG. 13 is stored in trust score storage 209. The trust score is updated at the timing at which the anomaly detection result is updated by trust score updater 206, for example.

In FIG. 13, each subject for which a trust score is to be held (each type of anomaly) is classified as an app (application), a user, a robot, communication, or an operating environment, as the trust score. Note that the subject may be classified as at least one of the foregoing. Which subject the anomaly is classified as may be determined based on a table in which detected anomalies and subjects which are causes of occurrences are associated with each other.

An app is further classified as a remote control app running on guest OS 203 of central ECU 200, an autonomous control app running on app module 502 of autonomous driving ECU 500, and a manual control app running on guest OS 203 of central ECU 200. The remote control app is a first application for the remote control mode, and is executed when the control mode of robot 10 is the remote operation mode. The autonomous control app is a third application for the autonomous control mode, and is executed when the control mode of robot 10 is the autonomous control mode. The manual control app is a second application for the manual control mode, and is executed when the control mode of robot 10 is the manual control mode. The remote control app, the autonomous control app, and the manual control app are executed exclusively, for example.

For users, the trust score is held for each user who has accessed and is logged in to robot 10.

Robots 10 are classified as devices and the like mainly related to a control platform of robots 10, and in FIG. 13, are classified as sensor ECU 600 and actuator ECU 700.

Communication is further classified as the network within the robot (the robot network), and external communication such as network 20.

Operating environment is classified into environments in which the robot operates, and in FIG. 13, is an environment in which a person or communication infrastructure (communication environment) is nearby robot 10.

In the example in FIG. 13, the trust score of the remote control app is 100, the trust score of the autonomous control app is 100, the trust score of the manual control app is 100, the trust score of user A is 80, the trust score of user B is 80, the trust score of sensor ECU 600 is 100, the trust score of actuator ECU 700 is 100, the trust score of the robot internal network (the control network) is 100, the trust score of external communication is 100, and the trust score of person/communication environment is 50.

Note that the type of the anomaly may be app, user, robot, communication, or operating environment, or may be remote control app, autonomous control app, manual control app, user A, user B, sensor ECU, actuator ECU, robot internal network, external communication, or person/communication environment.

Note also that app, user, robot, communication, or operating environment, or remote control app, autonomous control app, manual control app, user A, user B, sensor ECU, actuator ECU, robot internal network, external communication, or person/communication environment, can also be called types of trust scores.

Note that the trust score where the subject is "app" and "user" is a score used in common for robots 10a to 10c. Additionally, "app" and "communication" may be included in the subject "robot". An initial value of the trust score is pre-set.

1.14 Example of User Information

FIG. 14 is a diagram illustrating an example of the user information according to the present embodiment. The user information illustrated in FIG. 14 is stored in user information storage 210 of central ECU 200. The user information stores IDs of users logged in to robot 10 in association with permissions for the users.

FIG. 14 illustrates an example in which two users are logged in to robot 10, with user A having control permissions and user B having monitoring permissions.

1.15 Example of Control Mode

FIG. 15 is a diagram illustrating an example of a control mode according to the present embodiment. The control mode illustrated in FIG. 15 is stored in control mode storage 211 of central ECU 200. FIG. 15 indicates that the control mode of robot 10 is a state of remote control (the remote control mode). For example, the current control mode of robot 10 is "remote control".

Although the present embodiment describes the remote control mode, in which robot 10 is remotely controlled, the autonomous control mode, in which robot 10 performs autonomous control, and the manual control mode, in which robot 10 is controlled manually, as the control modes of robot 10, the control modes are not limited thereto. For example, an emergency control mode or the like can be included as another control mode.

Additionally, although the information stored in control mode storage 211 is only the control mode of robot 10 in the example in FIG. 15, a state related to the control of robot 10 may be included as well. For example, the location information of robot 10, the control state of robot 10 (such as traveling or being stopped), and the like may be included in the information stored in control mode storage 211. In other words, the location information of robot 10, the control state of robot 10, and the like may be stored in control mode storage 211.

1.16 Example of Robot State

FIG. 16 is a diagram illustrating an example of the robot states according to the present embodiment. The robot states illustrated in FIG. 16 are stored in robot state storage 33 of fleet management server 30. The states of all robots 10 managed by fleet management server 30 (in the example in FIG. 1, robots 10a, 10b, and 10c) are stored in robot state storage 33.

In the example in FIG. 16, robot 10a has a control mode of "remote control mode", location information of "XXX", and an operating state of "traveling on sidewalk"; robot 10b has a control mode of "autonomous control mode", location information of "YYY", and an operating state of "vehicle stopped"; and robot 10c has a control mode of "manual control mode", location information of "ZZZ", and an operating state of "stopped". Note that the robot states illustrated in FIG. 16 are states at the current point in time (e.g., the newest), for example.

1.17 Example of Account Information

FIG. 17 is a diagram illustrating an example of the account information according to the present embodiment. The account information illustrated in FIG. 17 is stored in account information storage 34 of fleet management server 30. The account information of the users managed by fleet management server 30 is stored in account information storage 34. For example, the account information of all users managed by fleet management server 30 is stored in account information storage 34.

The example in FIG. 17 indicates that user A is controlling robot 10a, user B is monitoring robot 10a, user C is monitoring robot 10b, and user D is monitoring robot 10c.

Note that one user is not limited to controlling or monitoring one robot 10, and one user may control or monitor a plurality of robots 10, or a plurality of users may control or monitor one robot 10.

Note also that in addition to user states, the account information may include permissions information provided to the user for robot 10, connection source information, and the like.

1.18 Example of Robot Trust Score

FIG. 18 is a diagram illustrating an example of robot trust scores according to the present embodiment. The robot trust scores illustrated in FIG. 18 are stored in robot trust score storage 44 of monitoring server 40. The trust score stored in monitoring server 40 is updated based on the trust score communicated from robot 10. For example, when the trust score illustrated in FIG. 13 is communicated by robot 10, the trust score of that robot 10, stored in robot trust score storage 44, is updated to the minimum of the subjects, excluding "user" and "operating environment".

In the example in FIG. 18, the trust score of robot 10a is 100, the trust score of robot 10b is 100, and the trust score of robot 10c is 50.

Note that the trust score may be stored in robot trust score storage 44 at the level of constituent elements in robot 10 instead of at the level of robot 10.

1.19 Example of User Trust Score

FIG. 19 is a diagram illustrating an example of user trust scores according to the present embodiment. The user trust scores illustrated in FIG. 19 are stored in user trust score storage 45 of monitoring server 40. The user trust scores stored in monitoring server 40 are updated based on the trust scores communicated from robot 10. For example, when the trust score indicated in FIG. 13 is communicated from robot 10, the trust score of that user, stored in user trust score storage 45, is updated to the user trust score which has been communicated.

FIG. 19 illustrates an example in which the trust score of user A is 80, the trust score of user B is 80, the trust score of user C is 50, and the trust score of user D is 20.

1.20 Control Mode Switching Sequence for Improper Remote Control by User

Figure 20:
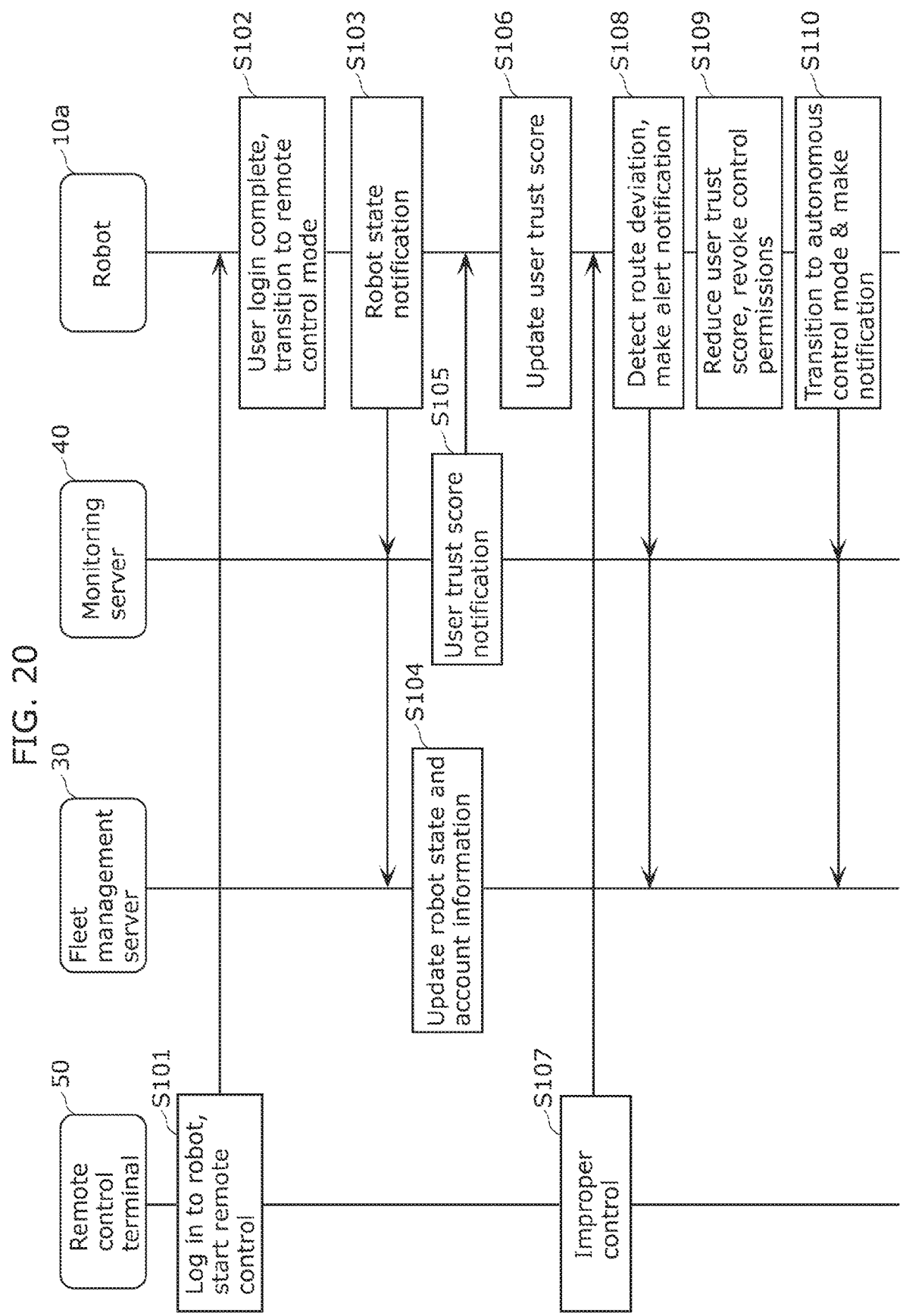
FIG. 20 is a diagram illustrating a control mode switching sequence performed for improper remote control by a user, according to an embodiment.

FIG. 20 is a diagram illustrating a control mode switching sequence (a control mode switching method) performed for improper remote control by a user, according to the present embodiment. Specifically, FIG. 20 illustrates a sequence for switching the control mode of robot 10a when a legitimate user operating remote control terminal 50 controls robot 10a to travel along an improper route.

(S101) Remote control terminal 50 performs processing for logging in to robot 10a through an operation from the user (a remote operator), and starts remote control of robot 10a. It can be said that the user operates remote control terminal 50, logs in to robot 10a, and starts remote control of robot 10a.

(S102) User manager 207 of robot 10a completes user authentication and completes the login. Once the login is complete, control permissions for robot 10a are provided to the user, and robot 10a transitions to remote control mode.

(S103) Robot 10a notifies fleet management server 30 and monitoring server 40 of the control mode of robot 10a and the robot state in the user information (the control mode, the user information, the location information, and the like).

(S104) Fleet management server 30 updates the robot state stored in robot state storage 33 and the account information stored in account information storage 34 according to the robot state notified.

(S105) Monitoring server 40 notifies robot 10a of the trust score of the user logged in to robot 10a, stored in user trust score storage 45, according to the robot state notified.

(S106) Based on the user trust score notified from monitoring server 40, trust score updater 206 of robot 10a updates the corresponding user trust score stored in trust score storage 209 of central ECU 200.

(S107) The user performs improper control of robot 10a through remote control terminal 50. Assume, for example, that the user has performed control through remote control terminal 50 to move robot 10a beyond an area where control is permitted in advance.

(S108) Based on the current location information and a predefined control area, anomaly detector 205 of robot 10a detects that a pre-set operation route (control route) is being deviated from (route deviation detection), and notifies fleet management server 30 and monitoring server 40 of a security alert.

(S109) Based on the anomaly of the route being deviated from, detected by anomaly detector 205, trust score updater 206 of robot 10a reduces the trust score of the user, who is the subject causing the anomaly. In this manner, trust score updater 206 reduces the user trust score when the detection result includes the detection of a user anomaly. Additionally, when the user trust score becomes less than or equal to a predetermined value (an example of a first threshold), response determiner 204 may determine to revoke that user's control permissions for robot 10a. Note that reducing the score is an example of updating the score.

(S110) Response determiner 204 of robot 10a transitions the control mode from remote control mode to autonomous control mode, and notifies fleet management server 30 and monitoring server 40 of the updated trust score and the state of robot 10a in the control mode. Note that in step S110, response determiner 204 may transition the control mode from remote control mode to manual control mode.

Note that when there are a plurality of users, response determiner 204 may calculate the trust score for each of the plurality of users, and when the control mode is the remote control mode and an improper user having a score that has become less than or equal to the first threshold is controlling robot 10a, perform at least one of rejecting control by the improper user, requesting a change to another user, or switching the control mode to a control mode aside from the remote control mode.

1.21 Control Mode Switching Sequence for Attack by Adjacent Third Party

Figure 21:
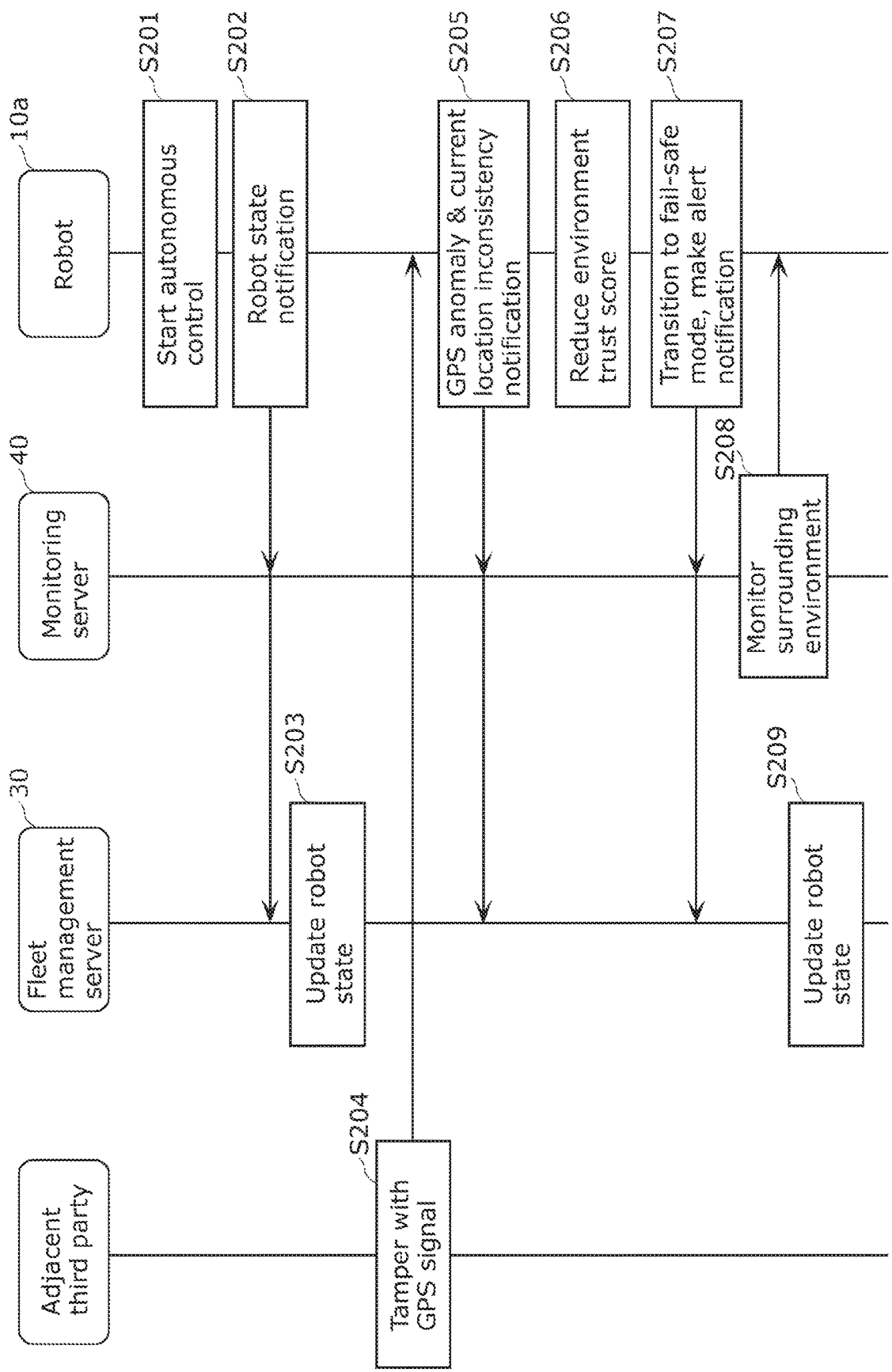
FIG. 21 is a diagram illustrating a control mode switching sequence performed for an attack by an adjacent third party, according to an embodiment.

FIG. 21 is a diagram illustrating a control mode switching sequence (a control mode switching method) performed for an attack by an adjacent third party, according to the present embodiment. FIG. 21 is a control mode switching sequence corresponding to a case where a malicious third party approaches robot 10a, tampers with the location information of robot 10a, and attempts to improperly control robot 10a. The malicious third party adjacent to robot 10a is assumed not to be logged in to robot 10a.

(S201) Robot 10a starts autonomous control in the autonomous control mode.

(S202) Robot 10a notifies fleet management server 30 and monitoring server 40 of the state of the control mode.

(S203) Based on the state of robot 10a notified, fleet management server 30 updates the robot state stored in robot state storage 33.

(S204) The malicious third party adjacent to robot 10a tampers with the GPS signal of robot 10a and improperly controls robot 10a.

(S205) Robot 10a detects an anomaly caused by a discontinuous change in the GPS signal and an inconsistency between the current position based on the GPS signal that has been tampered with and the current position recognized using a camera or the like, and notifies fleet management server 30 and monitoring server 40 of a security alert. The operations of step S205 are executed by anomaly detector 205, for example.

(S206) Trust score updater 206 of robot 10a reduces the trust score for the operating environment based on the anomaly detection result detected by anomaly detector 205. In this manner, trust score updater 206 reduces the operating environment trust score when the detection result includes the detection of an operating environment anomaly.

(S207) When the operating environment trust score decreases and becomes less than or equal to a predetermined value (an example of a third threshold), response determiner 204 of robot 10a determines that continuing autonomous control of robot 10a safely is difficult, transitions from autonomous control mode to fail-safe mode, and notifies fleet management server 30 and monitoring server 40 of the security alert and the state of robot 10a. Fail-safe mode is an autonomous driving mode in which the functions of robot 10a are restricted, and is a mode of performing the minimum necessary travel autonomously to an area where a safe stop can be made, and then stopping. Additionally, when the operating environment score has become less than or equal to the predetermined value (the third threshold), response determiner 204 may make a request to the exterior (e.g., fleet management server 30 and monitoring server 40) for an alert to confirm the operating environment.

(S208) Upon receiving the security alert, monitoring server 40 logs in to robot 10a, obtains monitoring permissions, and confirms the surrounding environment of robot 10a in order to confirm that an anomaly has occurred in the operating environment.

(S209) In response to the notification of the robot state, fleet management server 30 updates the robot state stored in robot state storage 33.

Although not illustrated in FIGS. 20 and 21, trust score updater 206 may reduce the trust score of robot 10a when the detection result includes detection of a robot anomaly, and response determiner 204 may switch the control mode to the fail-safe mode when the trust score of robot 10a becomes less than or equal to a predetermined value (a second threshold). Additionally, trust score updater 206 may reduce the application trust score when the detection result includes detection of an application anomaly, and when the application trust score becomes less than or equal to a predetermined value, response determiner 204 may switch to a control mode that uses an application aside from the application for which the trust score has become less than or equal to the predetermined value.

1.22 Overall Flowchart of Anomaly Response Processing by Central ECU

Figure 22:
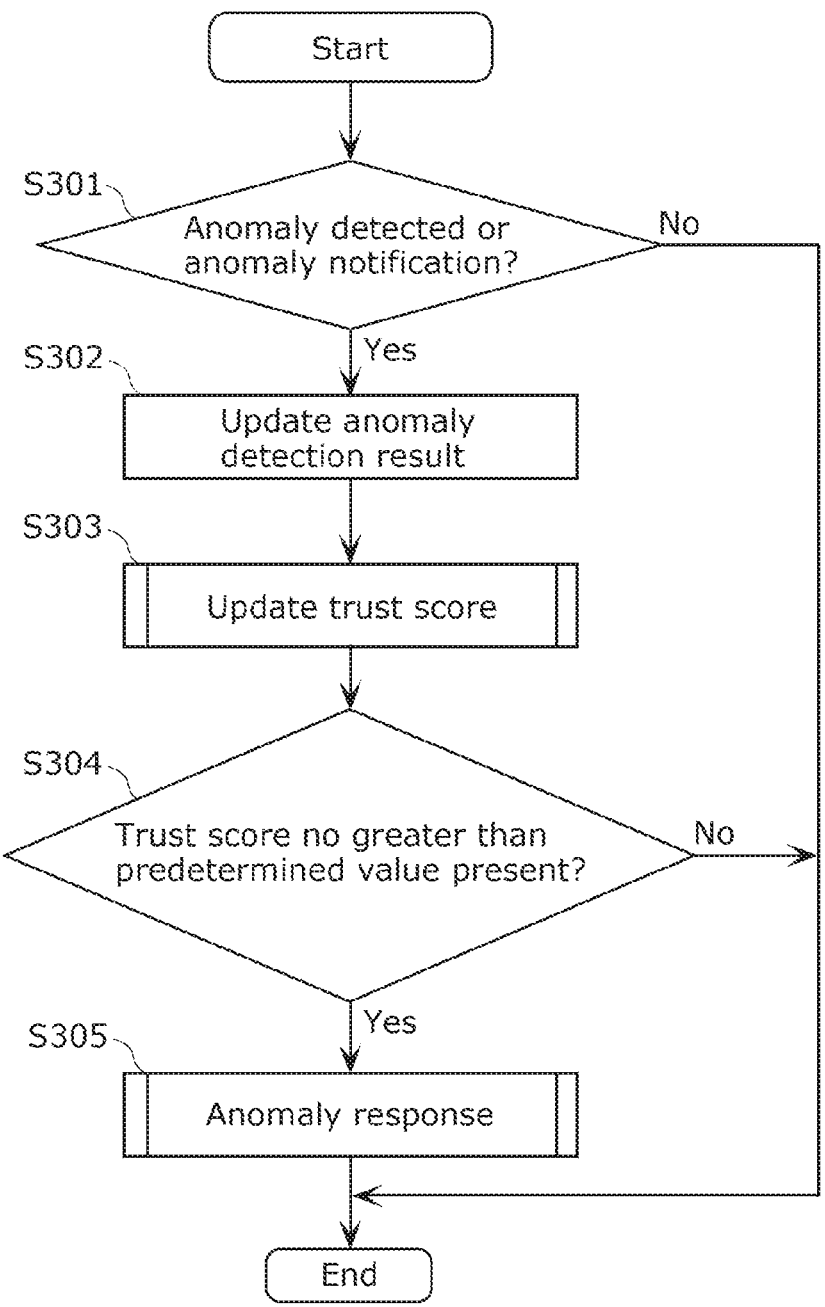
FIG. 22 is a flowchart illustrating an overview of anomaly response processing by a central ECU according to an embodiment.

FIG. 22 is a flowchart illustrating an overview of anomaly response processing (the control mode switching method) by central ECU 200 according to the present embodiment. FIG. 22 is an overall flowchart for central ECU 200, from when an anomaly is detected to when the anomaly is handled.

(S301) Central ECU 200 determines whether an anomaly has been detected or a notification of an anomaly has been made. If no anomaly is detected and no notification of an anomaly is made (No in S301), central ECU 200 ends the processing. However, if an anomaly is detected or a notification of an anomaly is made (Yes in S301), central ECU 200 executes step S302. Detection of an anomaly is determined based on whether anomaly detector 205 has detected an anomaly, for example. Additionally, the notification of an anomaly is determined based on whether a detection result in which an anomaly is detected is obtained through TCU 100, for example.

(S302) Based on the detected or notified anomaly, central ECU 200 updates the anomaly detection result stored in anomaly detection result storage 208.

(S303) Based on the anomaly detection result stored in anomaly detection result storage 208, central ECU 200 updates the trust score stored in trust score storage 209. The operations of step S303 will be described in detail later with reference to FIG. 23.

(S304) Central ECU 200 confirms whether there is a trust score less than or equal to a predetermined value (e.g., 50) stored in trust score storage 209. If there is no trust score that is less than or equal to the predetermined value (No in S304), central ECU 200 ends the processing. However, if there is a trust score that is less than or equal to the predetermined value (Yes in S304), central ECU 200 executes step S305.

(S305) Based on the trust score that has become less than or equal to the predetermined value and the current control mode, central ECU 200 performs anomaly response processing, and then ends this processing. The operations of step S305 will be described in detail later with reference to FIGS. 24 and 25.

1.23 Trust Score Update Flowchart by Central ECU

Figure 23:
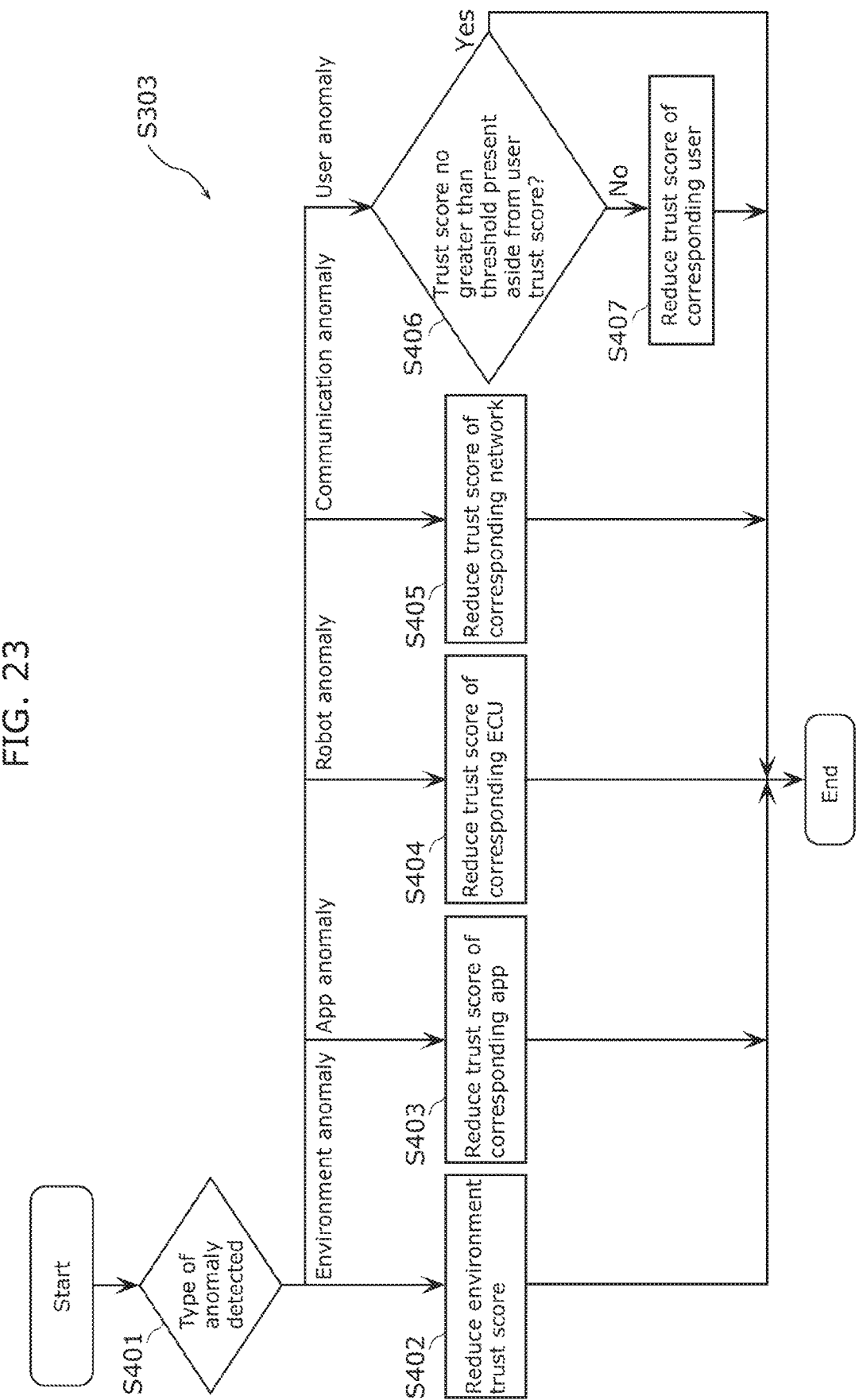
FIG. 23 is a flowchart illustrating trust score update processing by a central ECU according to an embodiment.

FIG. 23 is a flowchart illustrating the trust score update processing (the control mode switching method) by central ECU 200 according to the present embodiment. FIG. 23 is a flowchart illustrating, in detail, the processing performed by central ECU 200 for updating the trust score in step S303 of FIG. 22.

(S401) Central ECU 200 determines the type of the detected anomaly. When the detected anomaly is an environment anomaly, central ECU 200 executes step S402. When the detected anomaly is an app anomaly, central ECU 200 executes step S403. When the detected anomaly is a robot anomaly, central ECU 200 executes step S404. When the detected anomaly is a communication anomaly, central ECU 200 executes step S405. When the detected anomaly is a user anomaly, central ECU 200 executes step S406.

It can be said that in step S401, central ECU 200 estimates the type (cause of occurrence) of the detected anomaly based on a table in which the detected anomaly is associated with the type of anomaly corresponding to that anomaly, for example.

(S402) When the detected anomaly is an environment anomaly, e.g., when a GPS signal anomaly or tampering is detected, the external communication environment is detected as being cut off, or the like, trust score updater 206 of central ECU 200 reduces the operating environment trust score by a predetermined value, e.g., by 1.

(S403) When the detected anomaly is an app anomaly, e.g., when the application's CPU or memory resource usage, communication volume, communication destination, file access permissions, launching of improper processes, or the like is outside the range of a predetermined rule, trust score updater 206 of central ECU 200 reduces the trust score of that app by a predetermined value, e.g., by 1. The application's CPU or memory resource usage, communication volume, communication destination, file access permissions, launching of improper processes, or the like may be monitored by app monitorer 503. Whether these items are outside the range of the predetermined rule may be determined by anomaly detector 205. The predetermined rule is that a standard value is met (e.g., is less than or equal to a standard value). The standard value is pre-set and is store in central ECU 200, for example.

In this case, the detection result includes, for example, one of a remote operation app anomaly (a first application anomaly), a manual control app anomaly (a second application anomaly), and an autonomous control app anomaly (a third application anomaly) as the application anomaly. The remote operation app, the manual control app, and the autonomous control app are examples of anomaly types. Trust score updater 206 reduces the remote operation app score when the remote operation app anomaly is detected, reduces the manual control app score when a manual control app anomaly is detected, and reduces the autonomous control app score when an autonomous control app anomaly is detected.

(S404) When the detected anomaly is a robot anomaly, e.g., when a malfunction code is communicated from an ECU or the like, trust score updater 206 of central ECU 200 reduces the trust score of that ECU by a predetermined value, e.g., by 1.

(S405) When the detected anomaly is a communication anomaly, e.g., when an inconsistency in the network communication volume or communication messages is communicated by the network IDS, trust score updater 206 of central ECU 200 reduces the trust score of that network by a predetermined value, e.g., by 1.

(S406) When the detected anomaly is a user anomaly, e.g., when an anomaly considered to be detected due to an impropriety by the user, such as acceleration exceeding a predetermined value, travel control exceeding a predetermined speed, deviation from a predetermined area, activation of a safety mechanism such as an emergency brake, or the like, is detected in remote control mode, trust score updater 206 of central ECU 200 confirms whether there is a subject (anomaly) for which the trust score is less than or equal to a predetermined threshold, aside from the trust score of the user.

When there is a trust score less than or equal to a predetermined value (Yes in S406), trust score updater 206 of central ECU 200 determines that the user anomaly was caused by the subject having a low trust score, and ends the processing. In other words, the user trust score is not updated. In this manner, when the detection result includes detection of the user anomaly, and one of the score of robot 10a, the score of the operating environment, or the score of the application satisfies a predetermined condition, trust score updater 206 skips updating the score of the user. The predetermined condition includes at least one of the score of robot 10a being less than or equal to a predetermined value, the score of the operating environment being less than or equal to a predetermined value, and the score of the application being less than or equal to a predetermined value.

Meanwhile, when there is no trust score that is less than or equal to the predetermined value (No in S406), central ECU 200 executes step S407.

(S407) Trust score updater 206 of central ECU 200 reduces the trust score of the corresponding user by a predetermined value, e.g., by 1.

In this manner, trust score updater 206 estimates the cause of the occurrence of a detected anomaly from the anomaly, and reduces the trust score corresponding to the estimated cause of the anomaly.

The processing illustrated in FIG. 23 is executed each time an anomaly is detected, for example. In other words, one of the trust scores is updated each time an anomaly is detected. Note that the determination in step S406 need not be made.

1.24 Flowchart of Anomaly Response by Central ECU

Figure 24:
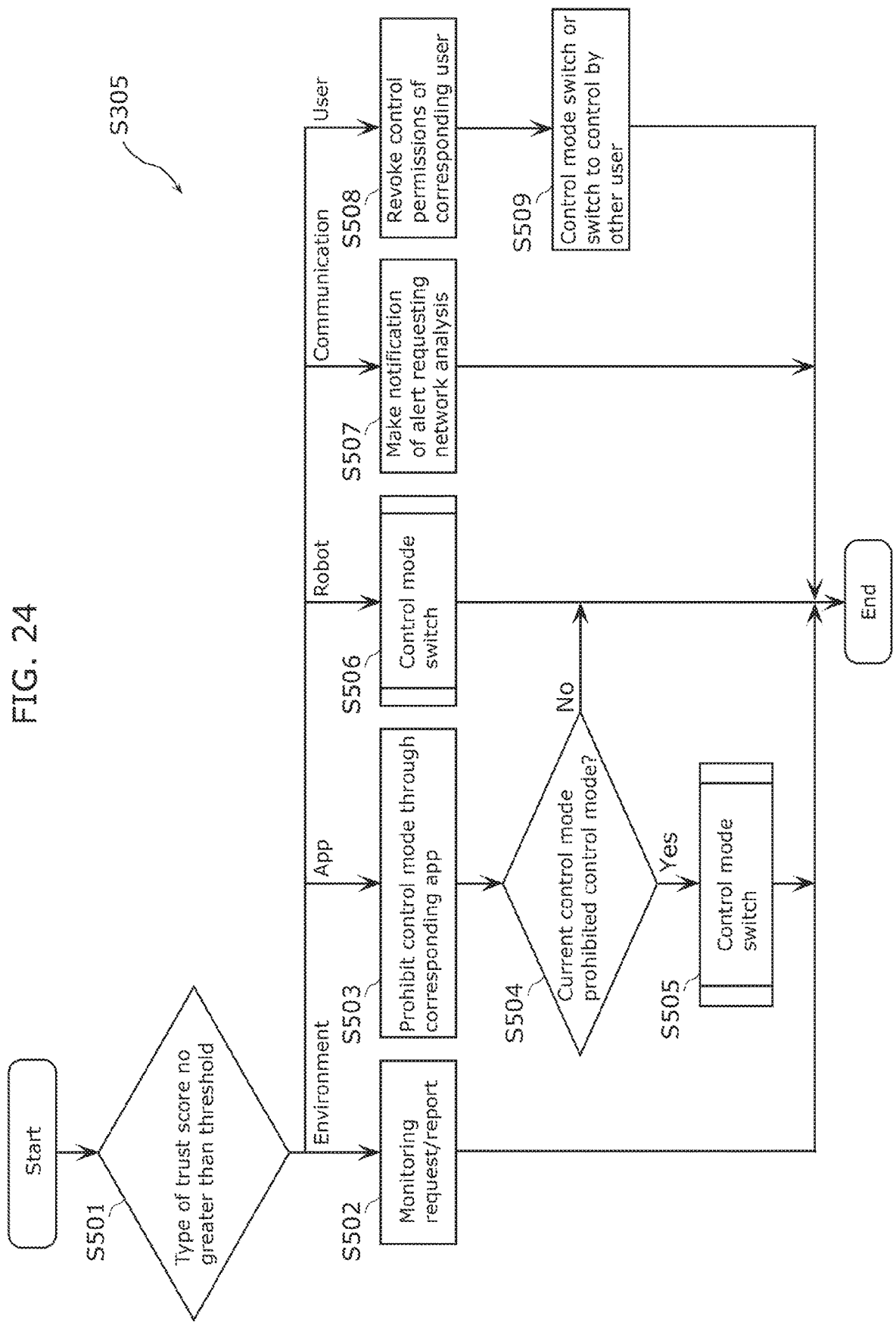
FIG. 24 is a flowchart illustrating anomaly response processing by a central ECU according to an embodiment.

FIG. 24 is a flowchart illustrating anomaly response processing (the control mode switching method) by central ECU 200 according to the present embodiment. FIG. 24 is a flowchart illustrating, in detail, the processing performed by central ECU 200 for responding to an anomaly in step S305 of FIG. 22.

(S501) Response determiner 204 of central ECU 200 confirms the type of the trust score that has become less than or equal to the threshold. When the type of the trust score that has become less than or equal to the threshold is "environment" (e.g., the operating environment), central ECU 200 executes step S502. When the type of the trust score that has become less than or equal to the threshold is "app", central ECU 200 executes step S503. When the type of the trust score that has become less than or equal to the threshold is "robot 10a", central ECU 200 executes step S506. When the type of the trust score that has become less than or equal to the threshold is "communication", central ECU 200 executes step S507. When the type of the trust score that has become less than or equal to the threshold is "user", central ECU 200 executes step S508.

(S502) Response determiner 204 of central ECU 200 makes a monitoring request or notification to fleet management server 30 and monitoring server 40.

(S503) Response determiner 204 of central ECU 200 prohibits control modes through the corresponding app (the app for which the trust score has become less than or equal to the threshold). For example, response determiner 204 of central ECU 200 prohibits the autonomous control mode when the trust score of the autonomous control app has become less than or equal to a predetermined threshold (a sixth threshold), prohibits the remote control mode when the trust score of the remote control app has become less than or equal to a predetermined threshold (a fourth threshold), and prohibits the manual control mode when the trust score of the manual control app has become less than or equal to a predetermined threshold (a fifth threshold). Fleet management server 30 and monitoring server 40 may be notified of the result of the determination.

Note that the fourth to sixth thresholds may be identical values, or may be different values.

(S504) Response determiner 204 of central ECU 200 confirms whether the current control mode stored in control mode storage 211 is prohibited. Response determiner 204 executes step S505 when the current control mode is prohibited (Yes in S504), and ends the processing when the current control mode is not prohibited (No in S504).

(S505) Response determiner 204 of central ECU 200 switches the control mode and ends the processing. The operations of step S505 will be described in detail later with reference to FIG. 25.

(S506) Response determiner 204 of central ECU 200 switches the control mode and ends the processing. The operations of step S506 will be described in detail later with reference to FIG. 25.

(S507) Response determiner 204 of central ECU 200 notifies monitoring server 40 of a security alert requesting analysis of the network anomaly, and then ends the processing.

(S508) Response determiner 204 of central ECU 200 determines to revoke the control permissions of the corresponding user. Specifically, response determiner 204 of central ECU 200 determines to set the permissions of the corresponding user to monitoring permissions, or prohibits the corresponding user from logging in to robots 10.

(S509) Response determiner 204 of central ECU 200 switches the control mode, or switches to remote control by an alternative user, and ends the processing. The operations for switching the control mode in step S509 will be described in detail later with reference to FIG. 25.

Note that when the trust scores of at least two types have become less than or equal to the predetermined thresholds, response determiner 204 may perform the response based on each score in an order of priority in which the trust score of robot 10a has the highest priority, the trust score of the operating environment has the next-highest priority, and the trust score of the user has the lowest priority. In other words, an order of priority may be provided for the responses to be executed. The order of priority is pre-set and stored in central ECU 200. Response determiner 204 may execute the processing of step S506 preferentially over the processing of step S508 when the trust score of robot 10a and the trust score of the user have become less than or equal to the predetermined thresholds. "Executing preferentially" includes, for example, executing the processing of step S506 earlier than the processing of step S508, as well as executing only the processing of step S506 among steps S506 and S508.

1.25 Flowchart for Switching Control Mode by Central ECU

Figure 25:
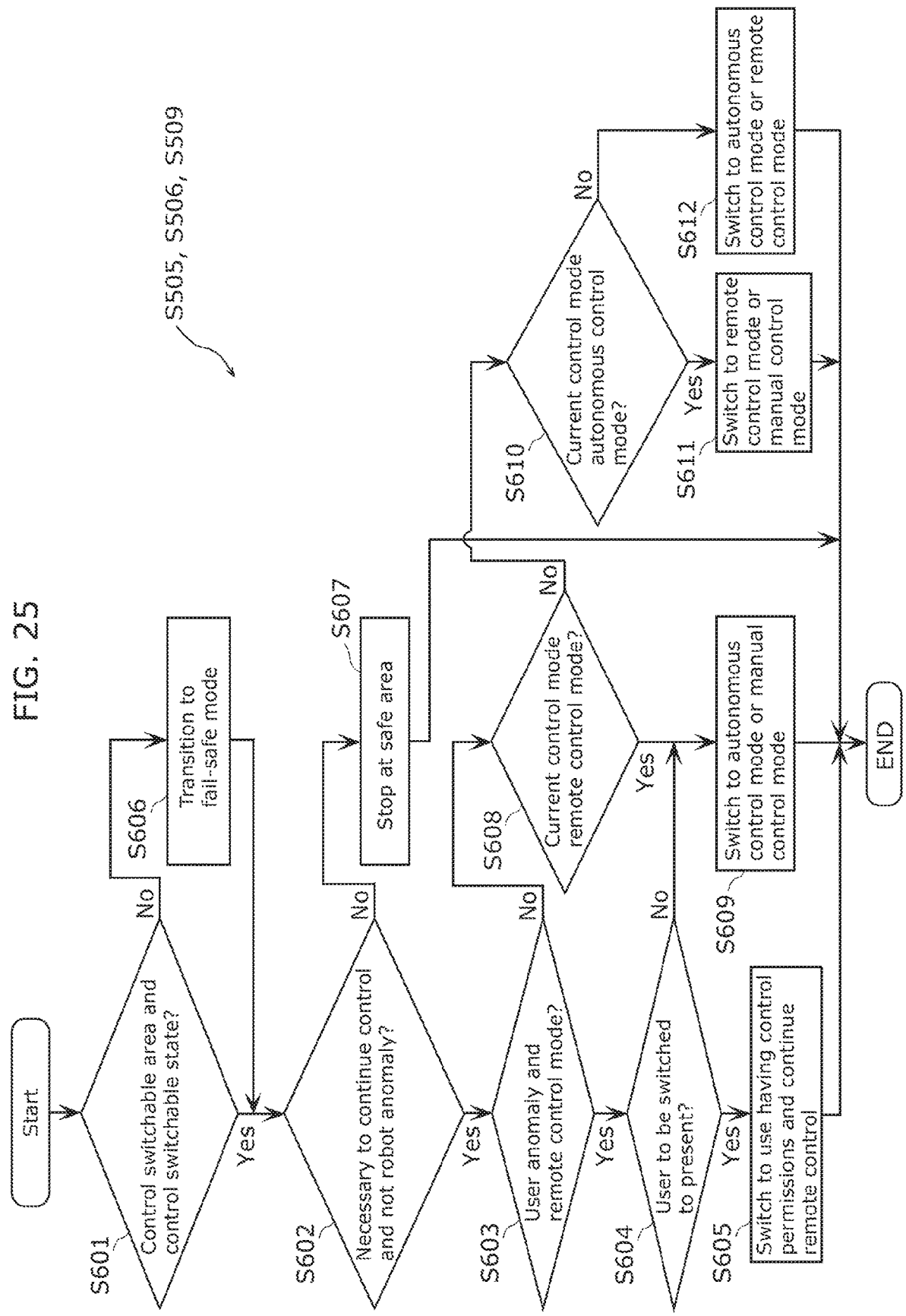
FIG. 25 is a flowchart illustrating control mode switching processing by a central ECU according to an embodiment.

FIG. 25 is a flowchart illustrating control mode switching processing (the control mode switching method) by central ECU 200 according to the present embodiment. FIG. 25 is a flowchart illustrating, in detail, operations performed by central ECU 200 for switching the control mode in steps S505, S506, and S509 of FIG. 24. The processing illustrated in FIG. 25 is executed in steps S505, S506, and S509 of FIG. 24. The operations illustrated in FIG. 25 are operations common to steps S505, S506, and S509, for example.

(S601) Response determiner 204 of central ECU 200 determines whether the current position of robot 10a is an area where the control mode can be switched, and whether the state is one in which the control mode can be switched. The area where the control mode can be switched is pre-defined, and a location where robot 10a can stop in a safe state is selected as the area where the control mode can be switched.

Additionally, the state in which the control mode can be switched is a state in which robot 10a is under predetermined control and safely switching control entities is not difficult. "Under predetermined control" is, for example, during travel operations (during travel control). For example, "during travel operations" is not a state in which the control mode can be switched, and "stopped" is a state in which the control mode can be switched.

Response determiner 204 of central ECU 200 executes step S602 when it is determined that the control mode can be switched (Yes in S601). However, response determiner 204 of central ECU 200 executes step S606 when it is determined that the control mode cannot be switched (No in S601).

Note that in step S601, at least one determination of whether the current position of robot 10a is an area where the control mode can be switched and whether the state is one in which the control mode can be switched may be made based on at least one of the sensor information and the state of robot 10a. This makes it possible to switch the control mode only in at least one of a case where robot 10a is in a predetermined control state and a case where robot 10a is present within a predetermined range.

(S602) Response determiner 204 of central ECU 200 confirms whether it is necessary to continue control of robot 10a and whether there is a robot anomaly (e.g., whether the trust score of robot 10a is less than or equal to the predetermined threshold). Response determiner 204 executes step S607 if it is not necessary to continue control of robot 10a or if there is a robot anomaly (e.g., the trust score of robot 10a is less than or equal to the predetermined value) (No in S602). However, response determiner 204 executes step S603 if it is necessary to continue control of robot 10a and there is no robot anomaly (e.g., the trust score of robot 10a is greater than the predetermined value) (Yes in S602).

Note that a case where it is necessary to continue control of robot 10a is a case where robot 10a is performing a predetermined task (e.g., carrying a load) and interrupting the control of robot 10a would reduce the availability of the service, or when interrupting the control of robot 10a would affect the safety of people, objects, or the environment in the surroundings.

(S603) Response determiner 204 of central ECU 200 determines whether there is a user anomaly (e.g., that the trust score of a user who currently has control permissions is less than or equal to a predetermined value) and the control mode is the remote control mode. Response determiner 204 executes step S604 when there is a user anomaly (e.g., the trust score is less than or equal to the predetermined value) and the control mode is the remote control mode (Yes in S603). However, response determiner 204 executes step S608 when there is no user anomaly (e.g., the trust score is greater than the predetermined value) or the control mode is not the remote control mode (No in S603).

Note that a determination of "No" is made in step S603 when, for example, there is no user anomaly but the control mode is the remote operation mode, when there is a user anomaly by the control mode is not the remote operation mode, and when there is an app anomaly. In other words, there is still a possibility that the anomaly is a user anomaly or an app anomaly when a determination of "No" is made in step S603.

(S604) Response determiner 204 of central ECU 200 determines whether a user to whom control permissions can be given is present. Response determiner 204 makes the determination of step S604 based on, for example, at least one of the account information illustrated in FIG. 17 or the user trust score illustrated in FIG. 19.

The user to whom control permissions can be given may be, for example, a user who is already logged in to robot 10a and has been given monitoring permissions, or a user newly assigned by fleet management server 30.

Response determiner 204 executes step S605 when a user to whom control permissions are given is present (Yes in S604). However, response determiner 204 executes step S609 when a user to whom control permissions are given is not present (No in S604).

(S605) Response determiner 204 of central ECU 200 gives the control permissions to the user to whom control permissions can be given, continues the remote control mode, and ends the processing. It can be said that response determiner 204 switches the control permissions of robot 10a from a for whom a user anomaly is determined to the user for which a determination of "Yes" is made in step S604 through step S508 (FIG. 24) and step S605. As a result, the user for whom the user anomaly is determined can no longer remotely control robot 10a. Switching the user is also included in switching the control mode.

(S606) Response determiner 204 of central ECU 200 transitions the control mode to the fail-safe mode, causes robot 10a to move to an area where the control mode can be switched, and executes step S602, assuming the state can be switched. For example, response determiner 204 executes step S602 after causing robot 10a to move to an area where the control mode can be switched and stop.

(S607) Response determiner 204 of central ECU 200 causes robot 10a to stop at a safe area, and ends the processing. An area where there are no problems even if robot 10a does not operate is selected as the safe area. Stopping in a safe area is also included in switching the control mode.

(S608) Response determiner 204 of central ECU 200 confirms whether the current control mode is the remote control mode. Response determiner 204 makes the determination of step S608 based on, for example, the current control mode stored in control mode storage 211. When the control mode is the remote control mode (Yes in S608), response determiner 204 executes step S609. However, when the control mode is not the remote control mode (No in S608), response determiner 204 executes step S610.

(S609) Response determiner 204 of central ECU 200 switches the control mode to the control mode, among the autonomous control mode and the manual control mode, which is not prohibited, continues the control, and ends the processing. When a determination of "Yes" is made in step S608, there is the possibility of a remote control app anomaly, and thus response determiner 204 switches to a control mode that uses another app.

Note that when none of the control modes are prohibited, response determiner 204 may switch to the control mode with an app having a higher trust score, or may switch to a control mode which takes less time to switch control. When all of the control modes are prohibited, response determiner 204 stops the control of robot 10a. Similar to step S607, response determiner 204 may cause robot 10a to stop in a safe area, for example.

(S610) Response determiner 204 of central ECU 200 confirms whether the current control mode is the autonomous control mode. Response determiner 204 makes the determination of step S610 based on, for example, the control mode stored in control mode storage 211. When the current control mode is the autonomous control mode (Yes in S610), response determiner 204 executes step S611. However, when the current control mode is not the autonomous control mode (No in S610), response determiner 204 executes step S612.

(S611) Response determiner 204 of central ECU 200 switches the control mode to the remote control mode or the manual control mode, and ends the processing. When a determination of "Yes" is made in step S610, there is the possibility of an autonomous control app anomaly, and thus response determiner 204 switches to a control mode that uses another app.

(S612) Response determiner 204 of central ECU 200 switches the control mode to the autonomous control mode or the remote control mode, and ends the processing. When a determination of "No" is made in step S610, there is the possibility of a manual control app anomaly, and thus response determiner 204 switches to a control mode that uses another app.

1.26 Effects of Embodiment

With the robot control mode switching method according to the present embodiment, based on a security anomaly detected in a robot system and the current control state of robot 10, the cause of the security anomaly can be analyzed, and a safe control mode can be selected. This makes it possible to realize a robot system in which safe control can be continued even when an anomaly is detected.

Other Variations

Although the present disclosure has been described based on the aforementioned embodiments, the present disclosure is of course not limited to the embodiments discussed above. The present disclosure is also inclusive of the following cases.

(1) Although the foregoing embodiment did not specify a specific service or application for the robot system, the embodiment may be applied to any robot. For example, the robot may be a self-driving vehicle, a ship system, or a mobility robot such as a drone, or may be a robot that performs specific tasks, such as an industrial robot or a humanoid robot. The entire robot may be mobile, or only a part of the elements constituting the robot (e.g., a robot arm) may be mobile. The "robot" of the present specification also includes robots which do not move.

(2) Although the robot has three control methods, namely autonomous control, manual control, and remote control, in the foregoing embodiment, it is not absolutely necessary for three control means to be provided. For example, it is sufficient for at least two control modes to be provided, such as remote control and autonomous control. The control modes are furthermore not limited to these three modes. For example, the robot may have a cooperative control mode for operating cooperatively with another robot, a control mode for operating in response to commands from a control center, or the like as other control modes.

(3) Although the foregoing embodiment described an example in which the remote control terminal connects to the robot and the robot transitions to the remote control mode in response to the user being authenticated, the user authentication may be performed by the fleet management server. Additionally, the remote control terminal may control the robot via the fleet management server. This makes it possible for the fleet management server to confirm a user's operation history, which increases the safety.

(4) Although the foregoing embodiment described a robot monitoring system in which functions are divided between the fleet management server and the monitoring server, the functions of the fleet management server and the monitoring server may be combined.

(5) Although the foregoing embodiment described the central ECU as periodically notifying the fleet management server and the monitoring server of the state of the robot, the robot state notification need not be performed periodically. For example, the robot state notification may be made in response to a request from the fleet management server or the monitoring server, or the robot state notification may be made when an event occurs in the robot, e.g., when a user logs in, when the control mode changes, when an anomaly is detected, or the like. This makes it possible to reduce the communication volume between the robot and the servers.

(6) Although the foregoing embodiment describes the response determiner as being within the robot, the determination to switch the control mode may be made in the monitoring server or the fleet management server. This makes it possible to further determine a response using area information on the servers, the states of nearby robots, and the like. However, having the robot make the determination makes it possible to switch the control mode immediately, switch the control mode even in situations where communication with the servers is difficult, and the like, which may increase the safety.

(7) Although the foregoing embodiment described an example in which the central ECU runs the guest OS on a virtual machine using a hypervisor or the like, the central ECU need not be provided with a hypervisor or virtualization technology.

(8) Although the foregoing embodiment described the central ECU as updating the trust score when an anomaly is detected, the timing at which to update the trust score need not be when an anomaly is detected. For example, the trust score may be updated by referring to the anomaly detection result storage at predetermined intervals. At this time, the trust score may be updated by making a comprehensive determination from the anomaly detection results newly detected since the last time the trust score was updated. For example, when a user's dangerous driving and an operating environment anomaly are newly detected at the same time as an anomaly detection result, it may be assumed that the anomaly of the user's dangerous driving has been detected as a result of the operating environment anomaly, and the user's trust score need not be reduced due to the user's dangerous driving.

(9) Although the foregoing embodiment described the anomaly detection content, the time, and the detecting device as being stored in the anomaly detection result storage, other information may be added to the anomaly detection result. For example, a severity of the anomaly may be included in the anomaly detection result. The severity may be determined according to the impact of the anomaly on the control of the robot. For example, the severity may be expressed in three levels, namely severe, moderate, and mild. "Severe" is a state in which there is or can be a major impact on the control of the robot or the safety of the surroundings, whereas "moderate" is a state in which there may be an impact on the control of the robot or the safety of the surroundings. "Mild" may be assumed to be a state in which there is a low likelihood of impact on the control of the robot or the safety of the surroundings. Through this, an immediate response or an alert notification to the monitoring server can be made according to the severity of the detected anomaly.

(10) Although the foregoing embodiment described in an example in which the trust score corresponding to the detected anomaly is reduced by 1 at a time when updating the trust score, the method for updating the trust score is not limited thereto. For example, as described in the other variation (9), the value of the reduction may be changed according to the severity of the anomaly. For severe anomalies, the number may be reduced by 10; for moderate anomalies, by 5; and for mild anomalies, by 1. The amount of reduction of the trust score (an example of an update amount) may be weighted according to the severity. Additionally, the maximum value of the trust score need not be 100, and need not be a numerical value. For example, the trust score may be expressed as levels, such as high, medium, or low.

(11) Although the foregoing embodiment described an example in which the trust score is updated by being reduced, processing for increasing the trust score may be performed. For example, the trust score may increase by a predetermined value each day; processing may be performed to increase the trust score of a subject that is not the cause of an anomaly when the monitoring server determines the cause of the anomaly; or the trust score may be restored (e.g., the trust score may be reset or increased) when the cause of an anomaly is fixed (e.g., when an improper application which had been installed in the robot is removed or the like). Additionally, the trust score may be increased when an anomaly is not detected for a predetermined time.

(12) Although the foregoing embodiment described holding only the information of users logged in from remote control terminals in the user information storage, the information of users performing manual control may be stored as well. At this time, the user performs the process of being authenticated by the robot and logging in. For example, the user may be authenticated using the user's possessions, such as an IC card, a smartphone, or the like in the user's possession; the user may be authenticated by stored information on the user, such as ID and password input or the like; the user may be authenticated using the user's biometric information, such as through facial recognition, fingerprint recognition, or the like; or the user may be authenticated through multifactor authentication combining the above. This makes it possible to realize more powerful management and robot access control in the fleet management server, even for user operations that manually control robots from nearby, which is effective in improving the safety.

(13) Although the foregoing embodiment described classifying the subjects for which trust scores are stored into apps, users, robots, communication, and operating environments, and then providing each with finer levels, finer levels need not be provided, and the classification method is not limited thereto. It is sufficient to include at least two of whether the anomaly is caused by a user performing remote control, whether the anomaly is caused by a constituent element within the robot, or whether the anomaly is caused by the operating environment of the robot.

(14) The foregoing embodiment described reducing the trust score of the user when dangerous control of the robot is detected while the control mode is the remote control mode, under the assumption that an anomaly caused by the user is detected. However, whether dangerous control is detected as a result of the user's control may further be determined by adding information on the user's control history. For example, when the control mode of the robot is the remote control mode and acceleration exceeding a threshold is detected, the trust score updater may refer to the most recent control history of the user; when the user is not performing control related to movement, the trust score updater may assume that likelihood that the anomaly was detected in the robot due to the user's control is low and the likelihood that the anomaly occurred due to the operating environment is high, and reduce the operating environment trust score. This makes it possible to accurately determine the cause of the anomaly, and is effective in increasing safety through appropriate responses.

(15) Although the foregoing embodiment described an example in which a monitoring request and a notification are performed as responses when an environment anomaly occurs, the response method is not limited thereto. For example, when the operating environment cannot be trusted, the autonomous control mode may be prohibited, under the assumption that autonomous control by the robot is dangerous.

(16) Although the foregoing embodiment described an example of making a monitoring request in response to detecting an operating environment anomaly, a remote user may be requested to confirm the operating environment during the remote control mode, or a remote operator may be notified of the presence of an improper third party nearby or an operating environment anomaly.

(17) Although the foregoing embodiment described an example in which the robot control permissions are revoked when the user trust score has become less than or equal to a predetermined value, the robot control permissions may be classified at even finer levels, and some of the control permissions may be restricted. For example, the robot control may be classified according to function, such as control permissions related to movement, control permissions related to opening and closing doors, and so on, and only control permissions related to movement may be revoked.

(18) In the foregoing embodiment, the user trust score was stored in the monitoring server, and the robot made determinations pertaining to the user's control permissions by synchronizing the user's trust score when the user logs in. However, the monitoring server may create a revoked list for users having low trust scores and distribute that list to robots or fleet management servers in advance. This makes it possible to immediately eliminate access by improper users, which increases the safety.

(19) Although the foregoing embodiment described defining the response according to the type of trust score which has become less than or equal to a predetermined threshold, the threshold may differ depending on the type of the trust score, and each threshold may differ depending on the robot. This makes it possible to flexibly implement a balance between safety and availability for each robot type and each operating environment.

(20) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(21) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. An FPGA (Field Programmable Gate Array) capable of post-production programming or a reconfigurable processor in which the connections and settings of the circuit cells within the LSI can be reconfigured may be used as well.

Further, if other technologies that improve upon or are derived from semiconductor technology enable integration technology to replace LSI circuits, then naturally it is also possible to integrate the function blocks using that technology. Biotechnology applications are one such foreseeable example.

(22) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(23) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be a computer system including a microprocessor and memory, where the memory records the above-described computer program and the microprocessor operates in accordance with the computer program.

Additionally, the present disclosure may be implemented by another independent computer system, by recording the program or the digital signal in the recording medium and transferring the recording medium, or by transferring the program or the digital signal over the network or the like.

(24) Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

The control mode switching apparatus according to the foregoing embodiment and the like may be realized as a single apparatus, or as a plurality of apparatuses. When the control mode switching apparatus is realized as a plurality of apparatuses, the constituent elements of the control mode switching apparatus may be distributed throughout the plurality of apparatuses in any manner. When the control mode switching apparatus is realized as a plurality of apparatuses, the communication method used among the plurality of apparatuses is not particularly limited, and may be wireless communication or wired communication. A combination of wireless communication and wired communication may also be used among the apparatuses. Additionally, each constituent element of the control mode switching apparatus may be provided in any one of the fleet management server, the monitoring server, or the remote control terminal, for example.

(25) The orders in which the steps in the flowcharts are performed are for describing the present disclosure in detail, and other orders may be used instead. Some of the above-described steps may be executed simultaneously (in parallel) with other steps, and some of the above-described steps may not be executed. Additionally, although steps S505, S506, and S509 were described as being common operations, the configuration is not limited thereto, and these steps may be different from each other.

(26) The above-described embodiments and variations may be combined as well. For example, variations on the present embodiment conceived by one skilled in the art, embodiments implemented by combining constituent elements from different other embodiments, and the like may be included as well in the present disclosure as long as they do not depart from the essential spirit of the present disclosure.

INDUSTRIAL APPLICABILITY

The present disclosure is useful in systems which manage robots that move in public places.

The invention claimed is:

1. A control mode switching apparatus that switches a control mode of a robot,
wherein the control mode includes all of the following modes: (i) a remote control mode in which the robot is controlled by a first user over an external network; (ii) a manual control mode in which the robot is controlled by being operated by a second user without using the external network; and (iii) an autonomous control mode in which the robot is controlled based on sensor information obtained by a sensor provided in the robot, and
the control mode switching apparatus comprises:
an obtainer that, based on a communication message on a control network in the robot and the control mode, obtains a detection result of detecting an anomaly occurring in the robot among at least one type of anomaly, the at least one type of anomaly including a user anomaly caused by control performed by the first user or the second user, a robot anomaly caused by the control network, an operating environment anomaly caused by an operating environment of the robot, or an application anomaly caused by an application run by a control device that is connected to the control network and that controls the robot; and
a switcher that, based on the detection result obtained, calculates, for each type of anomaly of the at least one type of anomaly, a score indicating a likelihood that the type of anomaly is a cause of the anomaly occurring in the robot, and switches the control mode of the robot based on each score calculated.

2. The control mode switching apparatus according to claim 1,
wherein the sensor information includes at least one of location information, an acceleration, a travel speed, or a camera image from the robot,
the user anomaly includes one of the location information deviating from an anticipated range of control, the acceleration or the travel speed exceeding a predetermined threshold, or the robot making physical contact with or approaching an unanticipated person or object based on the camera image, being detected while the control mode is the manual control mode or the remote control mode, the robot anomaly includes one of a notification of a malfunction included in communication information of the control network, or a first communication anomaly in the control network, being detected, and the operating environment anomaly includes one of a discontinuous change or an invalid value in the location information, a second communication anomaly in the external network, a voltage change in the control network, or disassembly of the robot, being detected.

3. The control mode switching apparatus according to claim 2,
wherein the switcher switches the control mode only when the robot is present within a predetermined range based on the location information of the robot.

4. The control mode switching apparatus according to claim 1,
wherein the at least one type of anomaly includes at least two of the user anomaly, the robot anomaly, the operating environment anomaly, and the application anomaly, and
the switcher updates a score of a user when the detection result indicates detection of the user anomaly, updates a score of the robot when the detection result indicates detection of the robot anomaly, updates a score of the operating environment when the detection result indicates detection of the operating environment anomaly, and updates a score of the application when the detection result indicates detection of the application anomaly.

5. The control mode switching apparatus according to claim 4,
wherein the switcher updates each score by reducing the score, and the switcher further:
calculates the score of the user for each of a plurality of first users each being the first user, and when the control mode is the remote control mode and an improper first user having a score that has become less than or equal to a first threshold is controlling the robot, performs at least one of rejecting control by the improper first user, requesting a change to another first user, or switching the control mode to one of the modes aside from the remote control mode;
switches the control mode to a fail-safe mode in which control of the robot is limited and the robot is stopped in a safe state, when the score of the robot has become less than or equal to a second threshold; and
issues an alert for confirming the operating environment to outside the control mode switching apparatus, when the score of the operating environment has become less than or equal to a third threshold.

6. The control mode switching apparatus according to claim 5,
wherein when at least two scores have become less than or equal to a predetermined threshold, the switcher performs a response based on each of the at least two scores in an order of priority in which the score of the robot has a highest priority, the score of the operating environment has a next-highest priority, and the score of the user has a lowest priority.

7. The control mode switching apparatus according to claim 4,
wherein when the detection result indicates detection of the user anomaly, and one of the score of the robot, the score of the operating environment, or the score of the application satisfies a predetermined condition, the switcher skips updating the score of the user.

8. The control mode switching apparatus according to claim 1,
wherein the application includes a first application for the remote control mode, a second application for the manual control mode, and a third application for the autonomous control mode,
the detection result indicates a first anomaly of the first application, a second anomaly of the second application, or a third anomaly of the third application as the application anomaly, and
the switcher:
reduces a first score of the first application when the first anomaly of the first application is detected, reduces a second score of the second application when the second anomaly of the second application is detected, and reduces a third score of the third application when the third anomaly of the third application is detected;
prohibits the control mode from becoming the remote control mode when the first score of the first application becomes less than or equal to a fourth threshold;
prohibits the control mode from becoming the manual control mode when the second score of the second application becomes less than or equal to a fifth threshold; and
prohibits the control mode from becoming the autonomous control mode when the third score of the third application becomes less than or equal to a sixth threshold.

9. The control mode switching apparatus according to claim 1,
wherein the switcher determines whether the robot is in a predetermined control state based on at least one of the sensor information or a state of the robot, and switches the control mode only when the robot is in the predetermined control state.

10. The control mode switching apparatus according to claim 1,
wherein the obtainer is an anomaly detector that detects the at least one type of anomaly based on the communication message and the control mode.

11. A control mode switching method for switching a control mode of a robot,
wherein the control mode includes all of the following modes: (i) a remote control mode in which the robot is controlled by a first user over an external network; (ii) a manual control mode in which the robot is controlled by being operated by a second user without using the external network; and (iii) an autonomous control mode in which the robot is controlled based on sensor information obtained by a sensor provided in the robot, and
the control mode switching method comprises:
obtaining, based on a communication message on a control network in the robot and the control mode, a detection result of detecting an anomaly occurring in the robot among at least one type of anomaly, the at least one type of anomaly including a user anomaly caused by control performed by the first user or the second user, a robot anomaly caused by the control network, an operating environment anomaly caused by an operating environment of the robot, or an application anomaly caused by an application run by a control device that is connected to the control network and that controls the robot; and based on the detection result obtained, calculating, for each type of anomaly of the at least one type of anomaly, a score indicating a likelihood that the type of anomaly is a cause of the anomaly occurring in the robot, and switching the control mode of the robot based on each score calculated.

12. A control mode switching apparatus, comprising:
a processor; and
a memory including a program that, when executed by the processor, causes the processor to perform functions, the functions comprising:
controlling the robot in accordance with a control mode from among a plurality of control modes, the plurality of control modes including all of the following: (i) a remote control mode in which the robot is controlled by a first user over an external network; (ii) a manual control mode in which the robot is controlled by being operated by a second user without using the external network; and (iii) an autonomous control mode in which the robot is controlled based on sensor information obtained by a sensor provided in the robot;

obtaining, based on a communication message on a control network in the robot and the control mode, a detection result of detecting an anomaly occurring in the robot among at least one type of anomaly, the at least one type of anomaly including a user anomaly caused by control performed by the first user or the second user, a robot anomaly caused by the control network, an operating environment anomaly caused by an operating environment of the robot, or an application anomaly caused by an application run by a control device that is connected to the control network and that controls the robot;

calculating, based on the detection result and for each type of anomaly of the at least one type of anomaly, a score indicating a likelihood that the type of anomaly is a cause of the anomaly occurring in the robot; and switching the control mode of the robot based on each score calculated.

* * * * *